(12) United States Patent
Jeon et al.

(10) Patent No.: US 9,079,776 B2
(45) Date of Patent: Jul. 14, 2015

(54) METHOD FOR PRODUCING GRAPHENES THROUGH THE PRODUCTION OF A GRAPHITE INTERCALATION COMPOUND USING SALTS

(75) Inventors: Seok-Woo Jeon, Daejeon (KR); Ki-Suk Kang, Daejeon (KR); Ji-Young Kwon, Uijeongbu-si (KR); Kwang-Hyun Park, Jeollanam-do (KR); Dong-Hwa Seo, Busan (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 279 days.

(21) Appl. No.: 13/519,950

(22) PCT Filed: Jun. 30, 2010

(86) PCT No.: PCT/KR2010/004249
§ 371 (c)(1),
(2), (4) Date: Jun. 29, 2012

(87) PCT Pub. No.: WO2011/081268
PCT Pub. Date: Jul. 7, 2011

(65) Prior Publication Data
US 2012/0321545 A1 Dec. 20, 2012

(30) Foreign Application Priority Data

Dec. 31, 2009 (KR) .................. 10-2009-0135358
Mar. 23, 2010 (KR) .................. 10-2010-0025777
Jun. 25, 2010 (KR) .................. 10-2010-0060759

(51) Int. Cl.
C01B 31/04 (2006.01)
B82Y 40/00 (2011.01)
B82Y 30/00 (2011.01)

(52) U.S. Cl.
CPC ............. *C01B 31/0423* (2013.01); *B82Y 30/00* (2013.01); *B82Y 40/00* (2013.01); *C01B 31/0469* (2013.01)

(58) Field of Classification Search
CPC .... B82Y 30/00; B82Y 40/00; C01B 31/0423; C01B 31/0469
USPC ...................................... 252/378 R; 423/448
See application file for complete search history.

(56) References Cited

U.S. PATENT DOCUMENTS 4,749,514 A 6/1988 Murakami et al.
4,957,723 A 9/1990 Nishino et al.
(Continued)

OTHER PUBLICATIONS

Herold, C., et al. "New synthesis routes for donor-type graphite intercalation compounds". J. Phys. Che. Solids vol. 57, Nos. 6-8 pp. 655-662 (1996).*

(Continued)

*Primary Examiner* — Richard M Rump
(74) *Attorney, Agent, or Firm* — William Park & Associates Ltd.

(57) ABSTRACT

The present invention relates a method for producing a graphite intercalation compound (GIC) and to the production of graphene using the same. The method of the present invention comprises the following steps: (a) obtaining alkaline metals or alkaline metal ions, or alkaline earth metals or alkaline earth metal ions, from alkaline metal salts or alkaline earth metal salts; (b) forming a graphite intercalation compound using the alkaline metals or alkaline metal ions, or the alkaline earth metals or alkaline earth metal ions; and (c) dispersing the graphite intercalation compound so as to obtain graphene. As the method of the present invention uses salts which are inexpensive and safe, graphite intercalation compounds can be easily produced at a low cost, and the graphene can be obtained from the thus-produced compounds, thereby reducing the costs of producing the graphene and enabling the easy mass production of the graphene.

11 Claims, 26 Drawing Sheets
(5 of 26 Drawing Sheet(s) Filed in Color)

(56) References Cited

U.S. PATENT DOCUMENTS

| | | |
|---|---|---|
| 2003/0157015 A1 | 8/2003 | Reinheimer et al. |
| 2004/0256605 A1* | 12/2004 | Reinheimer et al. .......... 252/606 |
| 2005/0232845 A1 | 10/2005 | Reynolds, III et al. |
| 2010/0055458 A1 | 3/2010 | Jang et al. |

OTHER PUBLICATIONS

Valles, C., et al. "Solutions of Negatively Charged Grapheen Sheets and Ribbons". J. Am. Chem. Soc. 130 15802-15804 (2008).*

Wang, Z. et al. "Stage formation of graphite intercalation compounds in molten salts". J. Mater. Chem. Feb. 1992 (6) 629-632.*

Viculis, L. et al. "Intercalation and exfoliation routes to graphite nanoplatelets". J. Mater. Chem., 2005, 15, 974-978.*

C. Herold et al., New Synthesis Routes for Donor-Type Graphite Intercalation Compounds, J. Phys. Chem Solids, 1996, pp. 655-662, vol. 57, Nos. 6-8, Great Britian.

Cristina Valles et al., Solutions of Negatively Charged Graphene Sheets and Ribbons, J. Am. Chem. Soc. 2008.

* cited by examiner

GRAPHITE

GIC

GRAPHENES

| | 1,2-DCB (A) | SOLUTION AFTER REACTION (B) | 1-iodo-2-chloro-bezene (C) |
|---|---|---|---|
| pH | 6.84 | 6.38 | 6.66 |

| A : DI WATER | 3 : 1 | 3 : 2 | 3 : 3 = 1 : 1 | 3 : 6 = 1 : 2 |
|---|---|---|---|---|
| pH | 7.12 | 6.98 | 7.33 | 7.08 |
| B : DI WATER | 3 : 1 | 3 : 2 | 3 : 3 = 1 : 1 | 3 : 6 = 1 : 2 |
| pH | 3.37 | 2.98 | 3.15 | 3.45 |
| C : DI WATER | 3 : 1 | 3 : 2 | 3 : 3 = 1 : 1 | 3 : 6 = 1 : 2 |
| pH | 7.15 | 6.90 | 7.08 | 7.32 |

METHOD FOR PRODUCING GRAPHENES THROUGH THE PRODUCTION OF A GRAPHITE INTERCALATION COMPOUND USING SALTS

TECHNICAL FIELD

The present invention relates to a method for producing graphene, and more particularly, to a method for producing a graphite intercalation compound (GIC) and to the production of graphene having a single layer or multi-layer structure by using the same.

BACKGROUND ART

Indium tin oxide (ITO) has been generally used as a transparent conducting electrode material in display fields due to high electrical conductivity and optical transparency. However, their properties are steeply decreased with bending on flexible substrates, especially increment of a sheet resistance above 1,000 times. Besides, a difference in thermal expansion coefficients between the ITO electrode and the plastic substrate causes many problems in application to the flexible devices. Currently, conductive polymer, carbon nanotubes (CNTs), carbon nanofibers (CNFs), and the like have been actively investigated in order to replace the ITO used as conducting electrodes. CNTs, high conductivity and an excellent adhering property on plastic substrates as well as mechanically and thermally stable properties, have been in the spotlight as next generation electrode material. In spite of these advantages, the CNTs still remain solving problems such as a low input/output current and poor contact surface between CNTs as well as synthesis of aligned CNTs on a required location in application to electronic device.

Graphene, two-dimensional plane of carbon atoms, has outstanding electrical, mechanical, and thermal properties. Its conductivity is about ~100 times faster than that of silicon at a room temperature and the current density is ~100 times per unit area higher than that of copper. Besides, they possess twice or more thermal conductivity higher than that of diamond and ~200 times mechanical strength with a high transparency compared to that of steel. Especially, hexagonal honeycomb structure of the graphene connected like a net can maintain the elasticity without noticeable signs of damage in electrical conductivity even for the unusual expanding or bending. Consequently, the unique properties of the graphene can bring replacement of ITO used as transparent conducting electrode and silicon mainly utilized as a semiconductor.

A scalable and economical route for generating the graphene without extreme degradations is required in order to apply the graphene having excellent properties to a flexible electronic device.

Generally, it has been known that the graphene is prepared by various methods such as mechanical exfoliation, epitaxial growth, thermal/gas expansion, chemical vapor deposition (CVD), graphene oxidation/reduction, graphite intercalation compound (GIC), and the like. Recently, the CVD and the graphene oxidation/reduction methods are actively researched so as to obtain high quality or large quantity of the graphene.

In mechanical exfoliation, a Scotch tape is attached to a graphite sample and then is detached from the graphite sample so as to obtain the graphene in the form of a sheet detached from graphite from the surface of the Scotch tape. In this case, the number of layers of the detached graphene sheet is not uniform, and its shape is a paper-torn shape and is not uniform. Furthermore, it is very difficult to obtain a large amount of scalable graphene sheets.

In the epitaxial growth, layers of the graphene are grown on a single crystalline silicon carbide (SiC) substrate. In thermal/gas expansion, a graphite oxide is heated at 1000° C. or higher so as to remove the graphite oxide and simultaneously to separate layers of graphite from each other, thereby producing the graphene. In the gaseous phase method, argon gas and ethanol aerosol are injected into a micro plasma reactor so as to form an argon plasma and to induce evaporation and decomposition of ethanol, and formation of the argon plasma is stopped so as to produce graphene in a solid state.

In CVD method, a catalyst metal is deposited on a substrate so as to form a thin metal layer, gas including carbon, argon, and hydrogen are flown to the metal layer at a high temperature of 800° C. or higher and then the thin metal layer is cooled down, thereby obtaining graphene formed on the metal layer. However, when a process of producing the graphene is performed at a high temperature of 700° C. or higher, the graphene may be damaged, and a process cost increases greatly.

FIGS. 1A and 1B are graphs showing the result of thermogravimetric analysis (TGA) of graphite, i.e., a variation of mass when graphite powder was heated. FIG. 1A is a graph showing the result of TGA of graphite when graphite powder was heated in the air including oxygen, and FIG. 1B is a graph showing the result of TGA of graphite at a nitrogen atmosphere in which oxygen is blocked.

As shown in FIGS. 1A and 1B, mass is decreased from a temperature of 700° C. or higher regardless of the case that oxygen is included (FIG. 1A) and the nitrogen atmosphere in which oxygen is blocked (FIG. 1B), due to oxidation of graphite and damage of a $sp^2$ bond. However, since most existing graphene producing processes are performed at a high temperature of 700° C. or higher, the graphene may be damaged, a process procedure is complicated, and a process cost increases.

As well as the disadvantage of too high process temperature, in the CVD method, the graphene may be damaged during a catalyst removing process, and scalable and economical graphene cannot be generated. In the graphene oxidation-reduction method, oxygen atoms are not fully removed during a reduction process.

The method of obtaining the graphene by oxidizing, dispersing and reducing graphite is a widely-used method. However, oxygen atoms are not fully removed during a reduction process.

FIGS. 2 through 4 show properties of the graphene produced by using the conventional oxidation-reduction method. FIGS. 2A through 2C show the result of X-ray photoelectron spectroscopy (XPS) of the graphene produced by using the conventional oxidation-reduction method. FIG. 2A shows the result of XPS of oxidation-reduction graphene before oxidized graphenes are reduced, FIG. 2B shows the result of XPS of oxidation-reduction graphene after reduction is performed, and FIG. 2C shows the result of XPS of oxidation-reduction graphene after thermal treatment is performed after reduction. As shown in FIGS. 2A through 2C, even when oxidized graphene are reduced and then thermally treated, considerable oxygen atoms (20% or more) are not removed and remain (Nature Nanotechnology 3, 270 (2008)).

FIG. 3 is a graph showing the result of Raman spectroscopy of graphene produced by using the conventional oxidation-reduction method. In FIG. 3, graph indicated by reference numeral 210 shows the result of Raman spectroscopy of one layer of graphene produced by using the conventional oxidation-reduction method, and graph indicated by reference numeral 220 shows the result of Raman spectroscopy of 10 layers of graphene produced by using the conventional oxidation-reduction method.

As shown in FIG. 3, in graphenes produced by using the conventional oxidation-reduction method, a D-peak is higher than a G-peak. A D-peak in the vicinity of 1,350 cm$^{-1}$ of Raman shift is increased when an impurity, such as oxygen, is included in the graphene (Nature Nanotechnology 3, 270 (2008)).

FIG. 4 is a graph showing the relationship between a sheet resistance and transmittance of the graphene. The less oxygen atoms removed, the higher transmittance of the graphene; however, a sheet resistance of the graphene is also increased. Since transmittance and sheet resistance are significant in using the graphene to form a transparent conducting layer, there may be a problem if oxygen atoms are not removed.

Thus, when the graphene is produced by using the conventional graphene oxidation-reduction method, oxygen atoms cannot be fully removed from the graphene and thus high quality of the graphene cannot be produced.

In the current GIC method, metal is inserted in graphite intercalation. An original graphite intercalation interval is 3.35 Å. However, when alkaline metals or alkaline earth metal ions are inserted in graphite intercalation, its intercalation interval is increased. In this case, the intercalation interval is further increased as an atomic radius of inserted ions of an element disposed on the lower part of the periodic table is increased.

However, according to the related art, metal is directly used to insert alkaline metal ions or alkaline earth metal ions are inserted in graphite intercalation, metal itself or metal is molten in a proper organic solvent and reacts with graphite, thereby producing a GIC. Since alkaline metals and alkaline earth metals as elements that belong to Groups 1 and 2 of the periodic table have very large reactivity, a process cannot be performed at an oxygen atmosphere, and they have very large explosiveness and thus it is difficult and dangerous to handle them.

In the production of a GIC, when molecules, such as tetrahydrofuran (THF), as well alkaline metal ions or alkaline earth metal ions are inserted in graphite intercalation (this is referred to as cointercalation), an interval of graphite intercalation is further increased, and dispersion into the graphene may be more easily performed. Table 1 shows an increase in an interval of graphite intercalation when metal ions are inserted in graphite intercalation and a further increase in the interval of the graphite intercalation when THF is added to metal ions.

TABLE 1

| Inserted Material | Graphite Intercalation Interval (Å) |
|---|---|
| When there is no inserted material, (pure graphite) | 3.35 |
| Lithium | 3.74 |
| Potassium | 5.41 |
| Lithium + THF (Cointercalation) | 7.24~12.45 |
| Potassium + THF (Cointercalation) | 7.15~12.27 |

DETAILED DESCRIPTION OF THE INVENTION

Technical Problem

The present invention provides a method for producing graphene that may be performed with a safe process at a low temperature so as to enable mass production of scalable and high-quality graphene.

Technical Solution

According to an aspect of the present invention, there is provided a method for producing graphene, including: (a) obtaining alkaline metals or alkaline metal ions, or alkaline earth metals or alkaline earth metal ions, from alkaline metal salts or alkaline earth metal salts; (b) forming a graphite intercalation compound using the alkaline metals or alkaline metal ions, or the alkaline earth metals or alkaline earth metal ions; and (c) dispersing the graphite intercalation compound so as to obtain graphene.

The method may further include removing a by-product formed in the forming of the graphite intercalation compound.

The alkaline metal salts or alkaline earth metal salts may include metal halide, and when two or more types of alkaline metal salts or alkaline earth metal salts are used, the salt mixture may be mixed at an eutectic mole ratio.

Advantageous Effects

According to the present invention, metal is not directly used but low-cost and safe salts are used to produce a graphite intercalation compound (GIC). Thus, a conventional process of producing a GIC that is expensive, complicated and dangerous can be changed to a low-cost, simple and safe process.

The present invention also proceeds at a low temperature. By using a salt mixture having a low eutectic point, a process of producing graphene can be performed at a low temperature. In particular, when a salt mixture is formed by selecting proper salts and a proper composition ratio, graphene can be produced even at a low temperature of 500° C. or less. By using a salt mixture including salts that do not contain oxygen, oxygen is not contained in the produced graphene so that high-quality graphene can be produced.

Thus, the price of the graphene can be reduced, the process of producing the graphene is easily performed and thus mass synthesis of the graphene can be performed. As a result, the present invention enables mass production of scalable and high-quality graphene having high quality, and the possibility of commercialization can be presented.

DESCRIPTION OF THE DRAWINGS

The patent or application file contains at least one drawing executed in color. Copies of this patent or patent application publication with color drawings(s) will be provided by the Office upon request and payment of the necessary fee. The above and other objects, features and advantages of the present invention will become more apparent to those of ordinary skill in the art by describing in detail exemplary embodiments thereof with reference to the accompanying drawings, in which.

BEST MODE

Figure 1A:
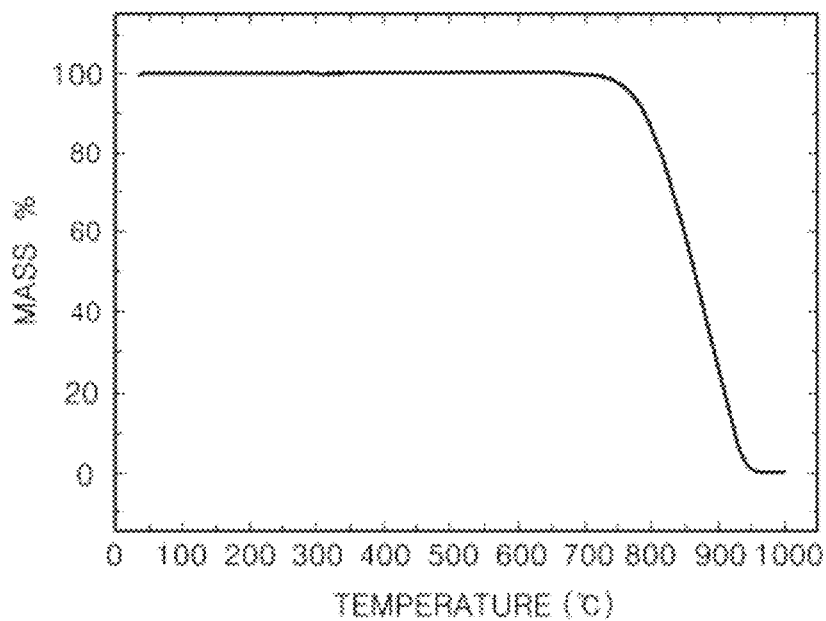
FIGS. 1A and 1B are graphs showing the result of thermogravimetric analysis (TGA) of graphite.
Figure 1B:
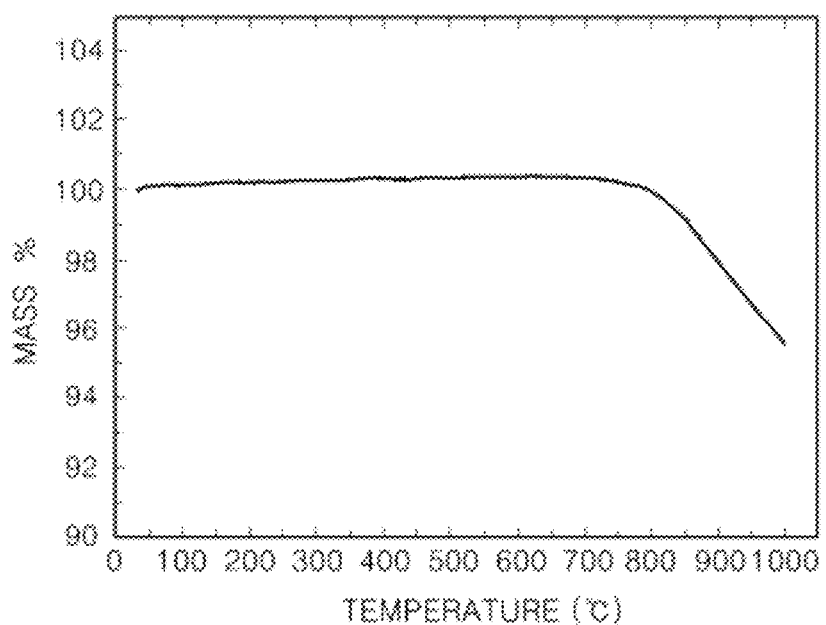
Figure 2A:
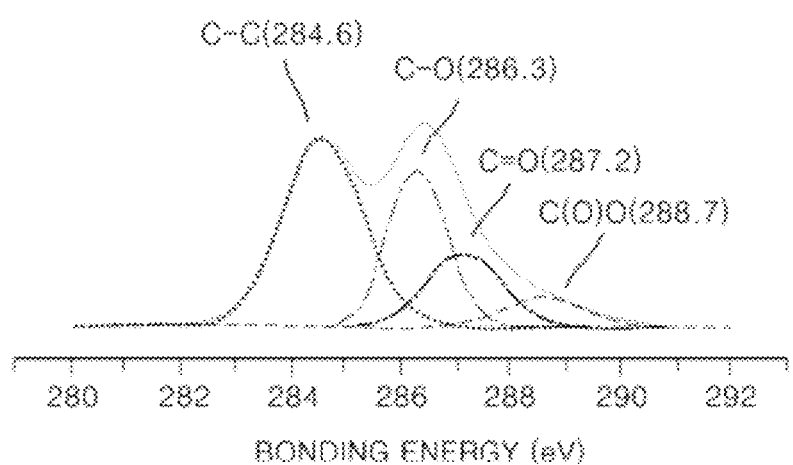
FIGS. 2A through 2C show the result of X-ray photoelectron spectroscopy (XPS) of the graphene produced by using a conventional oxidation-reduction method.
Figure 2B:
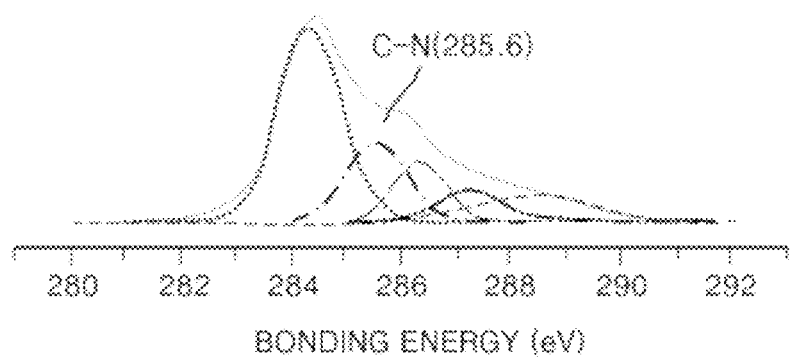
Figure 2C:
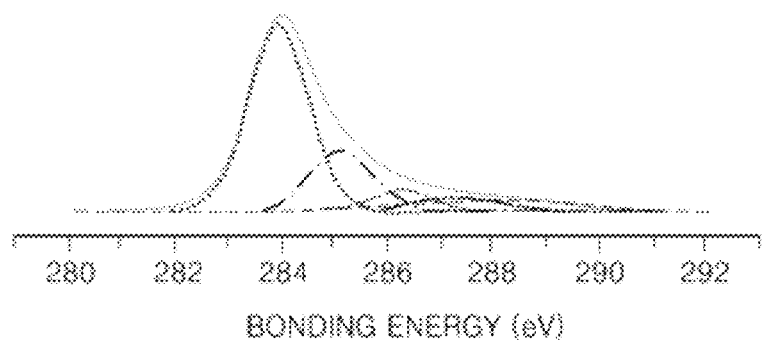

According to one aspect of the present invention, graphene is produced by performing the operations: mixing a salt mixture including two or more types of salts, wherein at least one of the two or more types of salts includes alkaline metal salts or alkaline earth metal salts, with graphite so as to produce a mixture; heating the mixture at an eutectic point of the salt mixture or more so as to melt the salt mixture; and inserting alkaline metal ions or alkaline earth metal ions generated by melting the salt mixture in intercalation of the graphite so as to increase an interval between layers of the graphite and to separate the layers of the graphite from each other.

According to another aspect of the present invention, graphene is produced by performing the operations: mixing a salt mixture including two or more types of salts, wherein at least one of the two or more types of salts includes alkaline metal salts or alkaline earth metal salts, with a solvent and graphite so as to produce a mixture; dissolving the salt mixture in the solvent; and inserting alkaline metal ions or alkaline earth metal ions generated by dissolving the salt mixture in intercalation of the graphite so as to increase an interval between layers of the graphite and to separate the layers of the graphite from each other.

According to another aspect of the present invention, graphene is produced by performing the operations: mixing alkaline metal salts or alkaline earth metal salts with a solvent and graphite so as to produce a mixture; obtaining alkaline metals or alkaline earth metals through a reaction between the solvent and the alkaline metal salts or alkaline earth metal salts; and inserting the alkaline metals or alkaline earth metals in intercalation of the graphite so as to increase an interval between layers of the graphite and to separate the layers of the graphite from each other.

MODE OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

Figure 5:
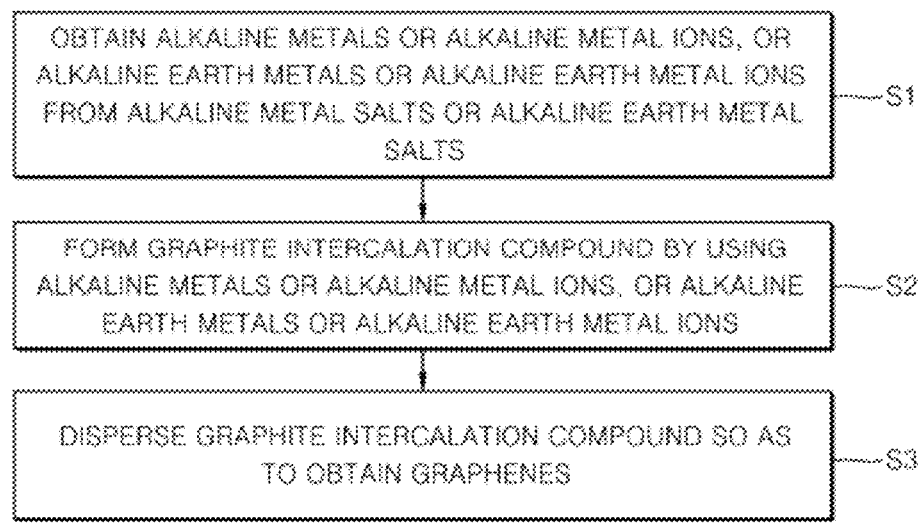
FIG. 5 is a flowchart illustrating a method for producing graphene according to an exemplary embodiment of the present invention.
Figure 6A:
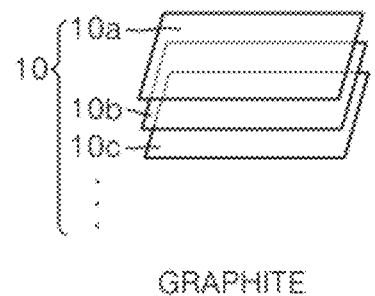
FIGS. 6A through 6C illustrate each of processes of the method illustrated in FIG. 5.
Figure 6B:
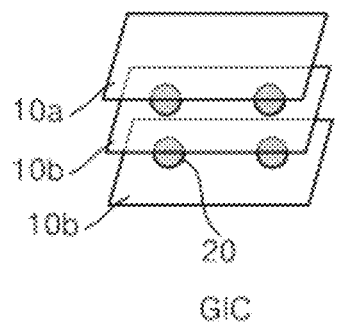
Figure 6C:
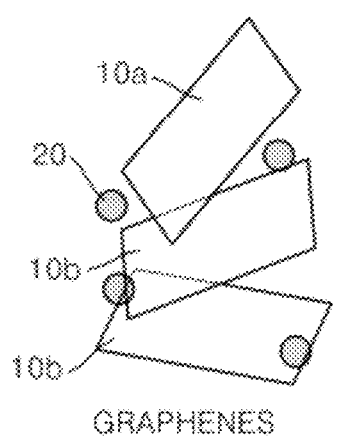

FIG. 5 is a flowchart illustrating a method for producing graphene according to an exemplary embodiment of the present invention, and FIGS. 6A through 6C illustrate each of processes of the method illustrated in FIG. 5.

First, in operation S1 of FIG. 5, alkaline metals or alkaline metal ions, or alkaline earth metals or alkaline earth metal ions are obtained from alkaline metal salts or alkaline earth metal salts. Although the type of salts is not particularly limited thereto, salts that are inexpensive, safe and are easy to handle may be selected. However, when salts that do not contain oxygen atoms are selected, graphite is not oxidized in a subsequent process. Thus, when salts that do not contain oxygen atoms are used, high-quality graphene including a $sp^2$ bond of only unoxidized carbon may be produced. In particular, salts may be metal halide.

Alkaline metal ions, or alkaline earth metal ions are obtained from alkaline metal salts having Li, Na, K, Rb, and Cs as positive ions, or alkaline earth metal salts having Be, Mg, Ca, Sr, and Ba as positive ions may be obtained by using two methods.

One method for obtaining alkaline metal ions, or alkaline earth metal ions from alkaline metal salts or alkaline earth metal salts is to heat alkaline metal salts, or alkaline earth metal salts at a melting point or higher. In this case, when two or more salts are put together, a melting point is lowered at a particular mixture mole ratio of two or more salts. The mole ratio and a temperature point in this case are referred to as an eutectic point, and the eutectic point may be known from a phase diagram of two or more salts, and Table 2 shows eutectic points of several salts.

TABLE 2

| | Salt 1 | Salt 2 | Eutectic point |
|---|---|---|---|
| mol (%) | KBr (734° C.) 65 | KCl (771° C.) 35 | 717° C. |
| mol (%) | KBr (734° C.) 59.5 | KF (857° C.) 40.5 | 581° C. |
| mol (%) | KBr (734° C.) 33 | KI (681° C.) 67 | 663° C. |
| mol (%) | KBr (734° C.) 40 | LiBr (550° C.) 60 | 329° C. |
| mol (%) | KCl (771° C.) 55 | KF (857° C.) 45 | 606° C. |
| mol (%) | KCl (771° C.) 40.8 | LiCl (610° C.) 59.2 | 353° C. |
| mol (%) | KF (857° C.) 32.8 | KI (681° C.) 67.2 | 543° C. |
| mol (%) | KI (681° C.) 36.6 | LiI (469° C.) 63.4 | 286° C. |

| | Salt 1 | Salt 2 | Salt 3 | Eutectic point |
|---|---|---|---|---|
| mol (%) | KF (857° C.) 39 | KCl (771° C.) 10 | KBr (734° C.) 51 | 580° C. |

Thus, a salt mixture includes two or more types of salts, wherein at least one of two or more types of salts includes alkaline metal salts or alkaline earth metal salts is heated at an eutectic point of the salt mixture or higher and is melted, thereby obtaining alkaline metal ions, or alkaline earth metal ions. When proper salts having an eutectic point of 500° C. are selected and two or more types of salts are mixed so as to form a two-phase or multiphase system, the graphene may be produced at a temperature of 600° C. or less that does not disturb a $sp^2$ bond of carbon. In addition, when the above-described proper salts are mixed at a proper mole ratio, such as an eutectic mole ratio, the graphene may be produced at a lower temperature.

Figure 7A:
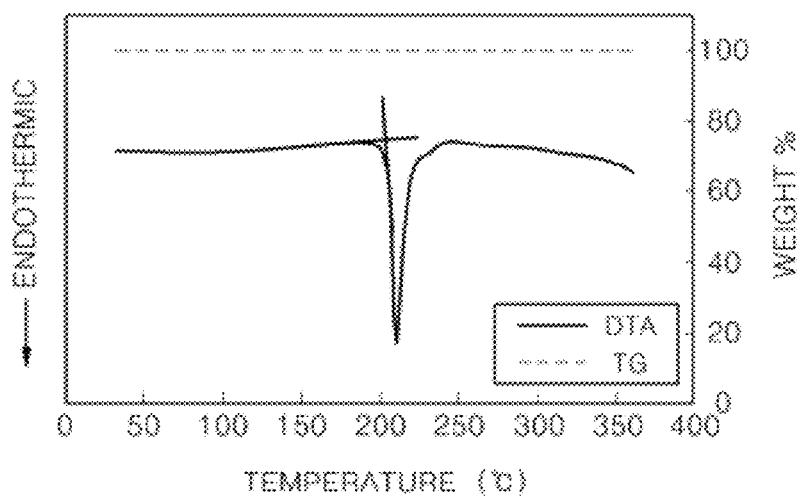
FIGS. 7A through 7C are graphs showing TG-DTA curves of a salt mixture including NaCl, KCl, and $ZnCl_2$.
Figure 7B:
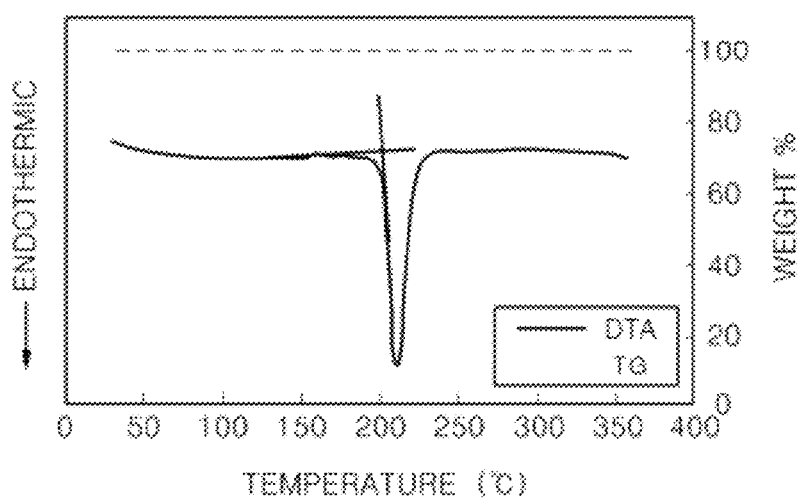
Figure 7C:
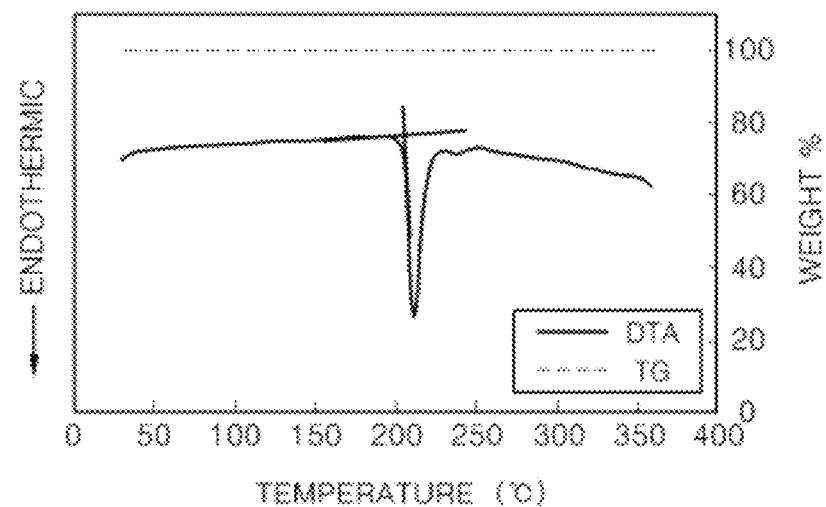

FIGS. 7A through 7C are graphs showing TG-DTA curves of a salt mixture including NaCl, KCl, and $ZnCl_2$. FIG. 7A shows a TG-DTA curve when a salt mixture is formed at a ratio of NaCl:KCl:$ZnCl_2$=0.225:0.225:0.550, FIG. 7B shows a TG-DTA curve when a salt mixtures is formed at a ratio of NaCl:KCl:$ZnCl_2$=0.200:0.200:0.600, and FIG. 7C shows a TG-DTA curve when a salt mixture is formed at a ratio of NaCl:KCl:$ZnCl_2$=0.175:0.175:0.650.

The melting point of the salt mixture including NaCl, KCl, and $ZnCl_2$ may be known from the results of TG-DTA analysis shown in FIGS. 7A through 7C. That is, it may be known from curves of DTA graphs that the salt mixture including NaCl, KCl, and $ZnCl_2$ may be melted at a temperature of about 200° C. The melting point of NaCl is 801° C., the melting point of KCl is 771° C., and the melting point of $ZnCl_2$ is 292° C., whereas the eutectic point of the salt mixture including NaCl, KCl, and $ZnCl_2$ is low of about 203° C.

Figure 8:
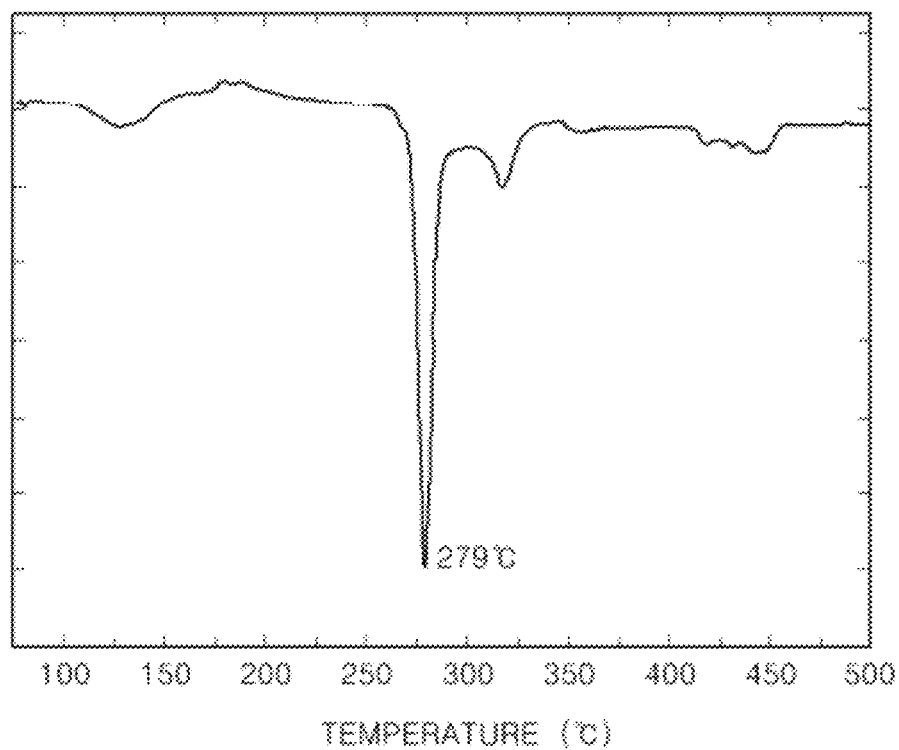
FIG. 8 is a graph showing a DSC analysis result of a salt mixture including NaCl, KCl, and $FeCl_3$.

FIG. 8 is a graph showing a DSC analysis result of a salt mixture in which NaCl, KCl, and $FeCl_3$ are mixed at a mole ratio of 0.2:0.2:0.6.

As shown in FIG. 8, the salt mixture in which NaCl, KCl, and $FeCl_3$ are mixed at a mole ratio of 0.2:0.2:0.6, is melted at a temperature of about 279° C. That is, NaCl having a melting point of 801° C., KCl having a melting point of 771° C., and $FeCl_3$ having a melting point of 303° C. constitute a multiphase system having an eutectic point of 279° C.

Thus, when a salt mixture including NaCl, KCl, and $ZnCl_2$, or a salt mixture including NaCl, KCl, and $FeCl_3$ is used, NaCl and KCl are melted at a very low temperature and thus $Na^+$ and $K^+$ that are alkaline metal ions may be obtained. Thus, by using the above-described salt mixture, the graphene may be produced at a very low temperature.

The other method for obtaining alkaline metal ions, or alkaline earth metal ions from alkaline metal salts or alkaline earth metal salts is to dissolve salts by using a solvent. Since a process temperature does not need to be increased to a melting point of salts compared to the first method, the process temperature may be further lowered.

A salt mixture including two or more types of salts may be used in obtaining alkaline metal ions, or alkaline earth metal ions from alkaline metal salts, or alkaline earth metal salts. In this case, salts, such as KI and KCl, having the same positive ions and different negative ions may be used, and salts, such as KI and LiI, having different positive ions and the same negative ions may be used. In addition, salts, such as KI and LiCl, having different negative and positive ions may be used. That is, salts including at least one type of salts including alkaline metals, or alkaline earth metals contained in positive ions may be used.

A salt mixture including two or more types of salts, wherein at least one of two or more types of salts is alkaline metal salts, or alkaline earth metal salts, is mixed with graphite so as to produce a mixture. The mixture is heated at an eutectic point of the salt mixture or higher so as to melt the salt mixture, or a solvent is added to the mixture so as to dissolve the salt mixture.

By putting a solvent in alkaline metal salts, or alkaline earth metal salts so as to dissolve the alkaline metal salts, or the alkaline earth metal salts, alkaline metals, or alkaline earth metals may be obtained. The method is to obtain alkaline metals, or alkaline earth metals through a chemical reaction between the alkaline metal salts, or the alkaline earth metal slats and the solvent.

Next, in operation S2 of FIG. 5, a graphite intercalation compound (GIC) is formed using alkaline metals or alkaline metal ions, or alkaline metal ions or alkaline earth metal ions obtained in operation S1. In this case, since a graphite intercalation distance is further increased by further adding at least one selected from the group consisting of THF, ammonia, toluene, benzene, dimetyl sulfoxide (DMSO), and dimetylformamide (DMF), the graphene may be more easily obtained.

An alkaline metal (or alkaline earth metal)-graphite intercalation compound is generally a compound that is voluntarily formed when alkaline metals or alkaline metal ions, or alkaline earth metal or alkaline earth metal ions are inserted in intercalation of graphite through a diffusion process. A diffusion distance may be calculated using diffusivity of alkaline metals or alkaline metal ions, or alkaline earth metals or alkaline earth metal ions, and thus an average size of the graphene may be predicted. In addition, by increasing diffusivity, the average size of the graphene may be increased.

However, when salts are heated at a melting point or higher, or are dissolved by a solvent, the salts exist as positive ions and negative ions and are neutral in an electrical aspect. Although a reaction in which alkaline metal ions or alkaline earth metal ions are inserted in intercalation of graphite is a voluntary reaction, the alkaline metal ions or the alkaline earth metal ions cannot be inserted in intercalation of graphite while an electrical neutral phase is destroyed.

Thus, according to the present invention, negative ions of the salt mixture are reacted using two or more salts. For example, when a mixture of KI and KCl is used as salts, I$^-$ of KI and Cl$^-$ of KCl meet each other, and a compound of ICl is formed. ICl is a unique compound that is formed when two materials having a tendency of negative ions meet each other. By reacting the negative ions, the positive ions are inserted in intercalation of graphite. That is, while ICl is formed, K$^+$ is inserted in intercalation of graphite. In this case, K$^+$ is changed into K and is inserted in intercalation of graphite. The inserted positive ions (alkaline metals or alkaline earth metal atoms) allow a distance between layers of graphite to be increased and allow the layers of graphite to be separated from each other. After the GIC is formed, an operation of removing a by-product, such as ICl, may be further performed.

When the GIC is formed using alkaline metals or alkaline earth metals obtained through a reaction between salts and a solvent, the alkaline metals or the alkaline earth metals are inserted in intercalation of graphite through diffusion.

Next, in operation S3 of FIG. 5, the GIC is dispersed so as to obtain the graphene. The dispersion operation is to remove atom-shaped alkaline metals or alkaline earth metals inserted in intercalation of graphite from the GIC.

Referring to FIGS. 6A through 6C that illustrates each of processes of the method illustrated in FIG. 5, first, as illustrated in FIG. 6A, graphite 10 as a raw material includes several layers 10a, 10b, 10c, . . . . When alkaline metals or alkaline metal ions, or alkaline earth metals or alkaline earth metal ions 20 obtained from alkaline metal salts or alkaline earth metal salts in operation 51 are inserted in graphite layers 10a, 10b, 10c, . . . in operation S2, there is no change in alkaline metals or alkaline earth metals, and alkaline metal ions or alkaline earth metal ions are changed into alkaline metals or alkaline earth metals, thereby forming a GIC 30 illustrated in FIG. 6B.

Next, alkaline metals or alkaline earth metals 20 inserted in intercalation of the GIC 30 are removed by performing operation S3. When alcohol having a hydroxyl (—OH) group or a proper solvent is applied to the GIC 30, the alkaline metals or alkaline earth metals 20 are removed from the GIC 30, and the graphite 10 is decomposed into several layers 10a, 10b, 10c, . . . . Graphite with a single layer or multiple layers is the graphene.

Hereinafter, specific experimental examples will be described.

First Experimental Example

In the present experimental example, K ions as alkaline metals were selected as ions to be inserted in intercalation of graphite, and a salt mixture of KI and KOH was used as alkaline metal salts to provide K ions.

Figure 9:
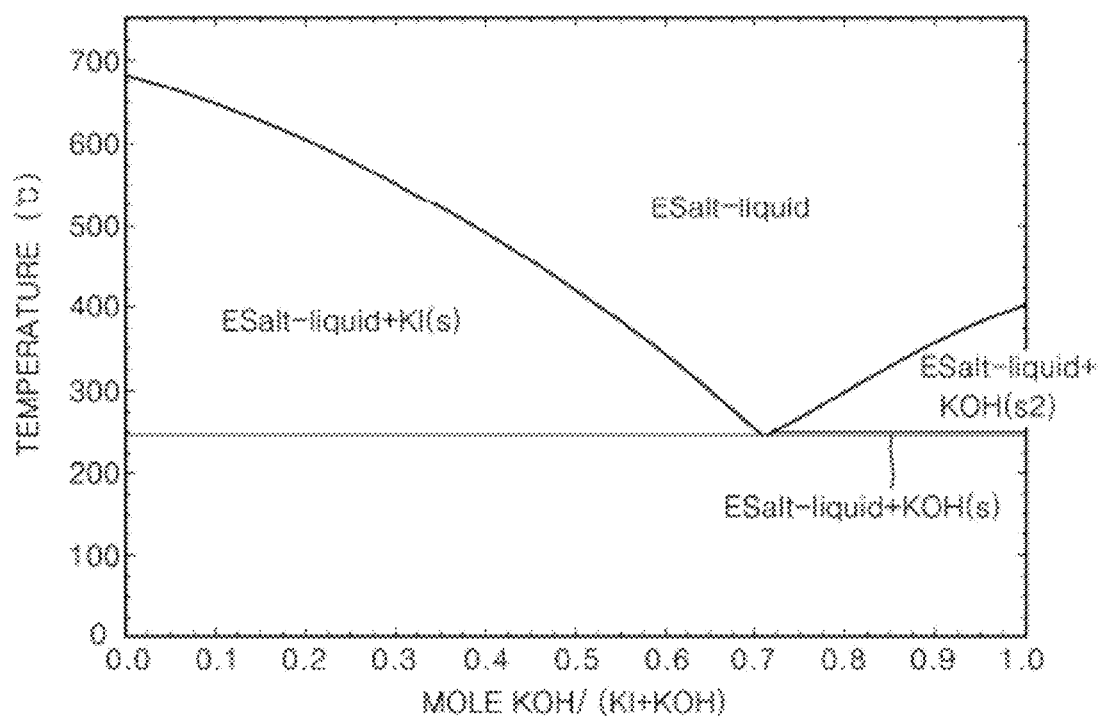
FIG. 9 is a graph showing phases of KI and KOH used in a first experimental example of the present invention.

FIG. 9 is a graph showing phases of KI and KOH. In FIG. 9, when two or more salts were mixed at a predetermined mole ratio, the melting point of the salt mixture was lowered. Since KI and KOH each have a low eutectic point of 250° C., as shown in FIG. 9, by heating KI and KOH at a temperature of 250° C. or higher at an eutectic point mole ratio, graphite may be dispersed without adding a solvent to the KI and KOH.

Figure 10A:
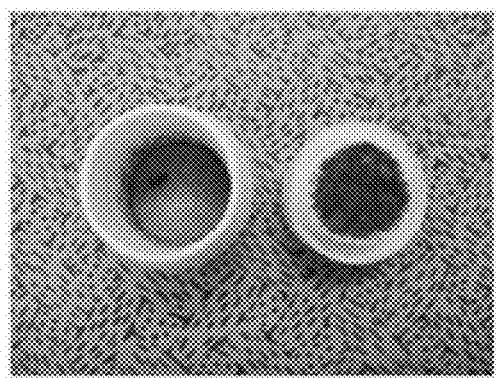
FIG. 10A is a photo showing the case that KI, KOH, and highly oriented pyrolytic graphite (HOPG) pieces were put in a capsulated container and were heated in the first experimental example of the present invention.
Figure 10B:
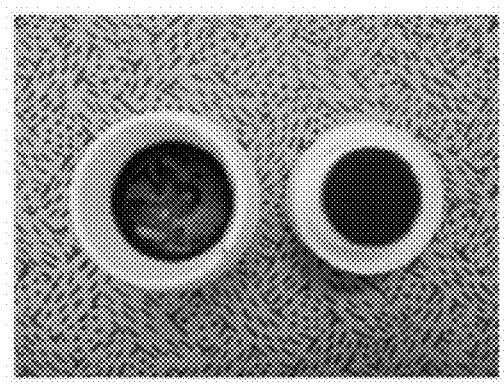
FIG. 10B is a photo showing the case that THF was put in KI and KOH.

FIG. 10A is a photo showing the case that KI, KOH, and highly oriented pyrolytic graphite (HOPG) pieces were put in a capsulated container and were heated at 250° C. and then the capsulated container was opened. In FIG. 10A, since the HOPG pieces were dispersed, the graphene was produced. FIG. 10B is a photo showing the case that THF was put in KI and KOH, and in FIG. 10B, dispersion was well performed. When K and THF were put in KI and KOH, an interval between layers of graphite increases, and it is more advantageous to produce the graphene by dispersing graphite. In both cases, HOPG was completely dispersed by heat and pressure. After experiments were conducted (by using an uncapsulated container) without applying pressure through supplementary experiments, HOPG was not dispersed.

Figure 11:
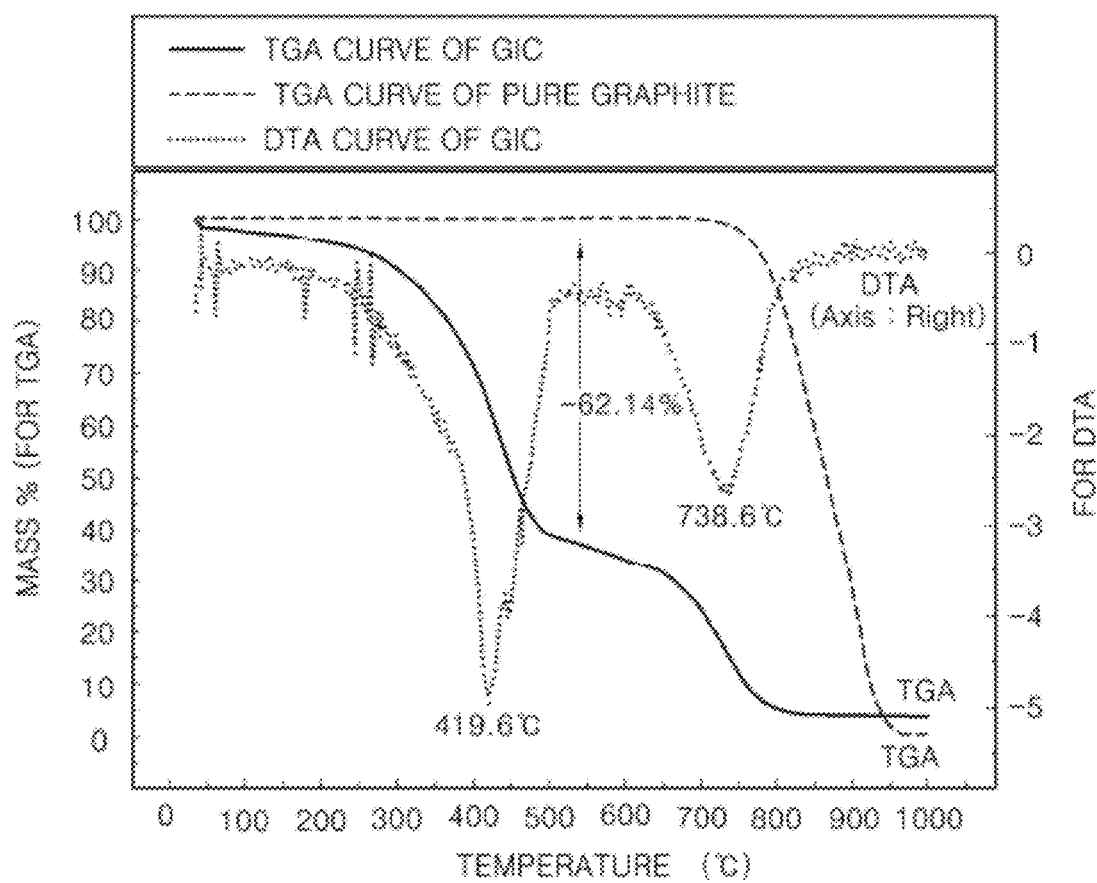
FIG. 11 is a graph showing a TGA result of a K-graphite intercalation compound produced on a KI—KOH condition in the first experimental example of the present invention.

FIG. 11 is a graph showing a thermogravimetric analysis (TGA) result of a K-GIC produced on a KI—KOH condition.

A change of mass occurs in pure graphite due to oxidation at 800° C. However, as the temperature increases, the van der Waals force of K inserted in intercalation of graphite with graphite decreases, and at 400 to 500° C. the K-GIC is removed, and thus a rapid change of mass occurs in the K-GIC. An oxidation temperature of the K-GIC is less than 100° C. compared to pure graphite. According to the TGA result, a rapid decrease of mass occurs at 419.6° C., and thus the K-GIC was formed according to the present experimental example.

Second Experimental Example

In the second experimental example, a salt mixture of KI and KCl was used as alkaline metal salts to provide K ions.

Figure 12:
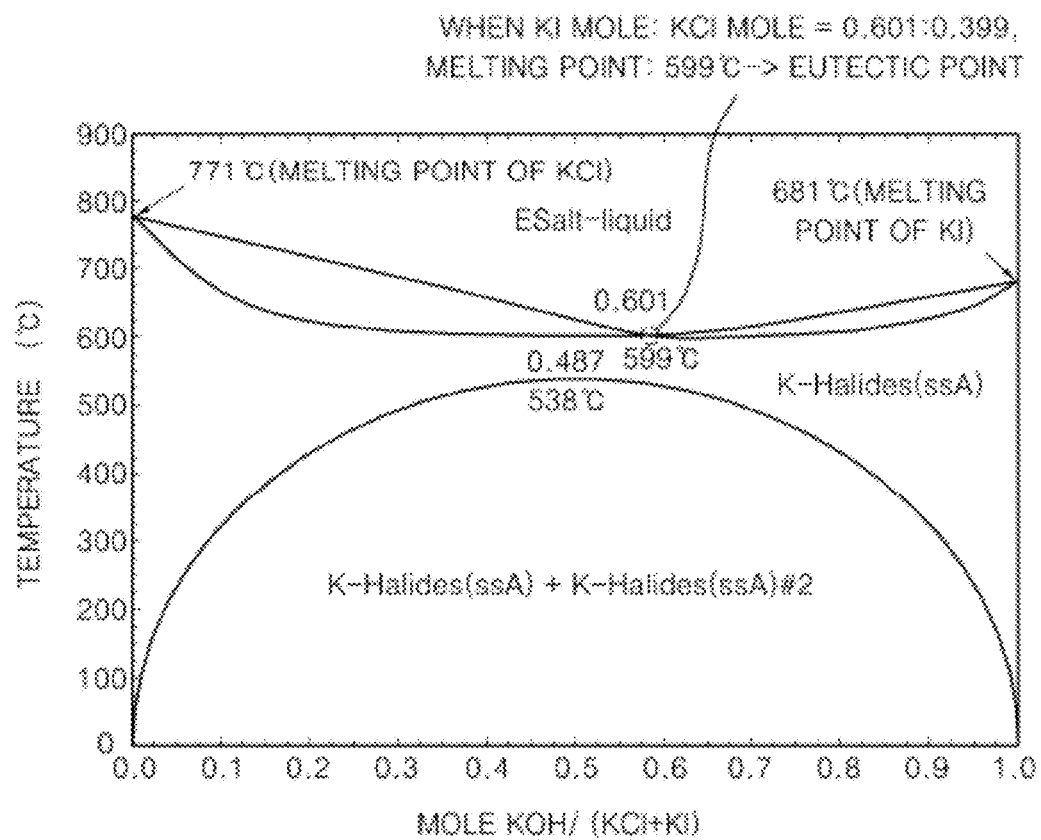
FIG. 12 is a graph showing phases of KI and KCl used in a second experimental example of the present invention.

Since KI and KCl each have a high eutectic temperature of 599° C., as shown in FIG. 12, graphite cannot be dispersed only using salts; however, two salts were dissolved in dichlorobenzene (DCB) and then were heated and thus graphite was dispersed.

A specific process is as follows. When KI, KCl, DCB, and graphite were put in a container and the container was capsulated, the capsulated container was heated at 250° C. so as to produce a K-GIC. After that, when the K-GIC was put in ethanol, inserted K was removed, and the graphene was produced.

When salts were dissolved in a solvent, the salts exist as positive ions and negative ions and are neutral in an electrical aspect. Although a reaction in which alkaline metals are inserted in intercalation of graphite is a voluntary reaction, $K^+$ cannot be inserted in intercalation of graphite while an electrical neutral phase is destroyed. On the above condition, $I^-$ of KI and $Cl^-$ of KCl met each other, and a compound of ICl was formed. ICl is a unique compound that is formed when two materials having a tendency of negative ions meet each other. That is, while ICl was formed, $K^+$ was changed into K and was inserted in intercalation of graphite.

Figure 13A:
FIG. 13A is a photo showing KI and KCl dispersed in dichlorobenzene (DCB) after undergoing a thermal process in the second experimental example of the present invention.
Figure 13B:
FIG. 13B is a photo showing KI and KCl mixed with ethanol after being dispersed in DCB.

ICl is a compound having a bronze color. FIG. 13A is a photo showing KI and KCl dispersed in DCB after undergoing a thermal process, and in FIG. 13A, ICl was formed from the bronze color. However, when ICl is dissolved in a solvent having a hydroxyl (—OH) group, ICl has a yellow color. FIG. 13B is a photo showing KI and KCl mixed with ethanol after being dispersed in DCB, and in FIG. 13B, ICl has a yellow color. Formation of ICl could be checked from a change in colors of FIGS. 13A and 13B.

Figure 14:
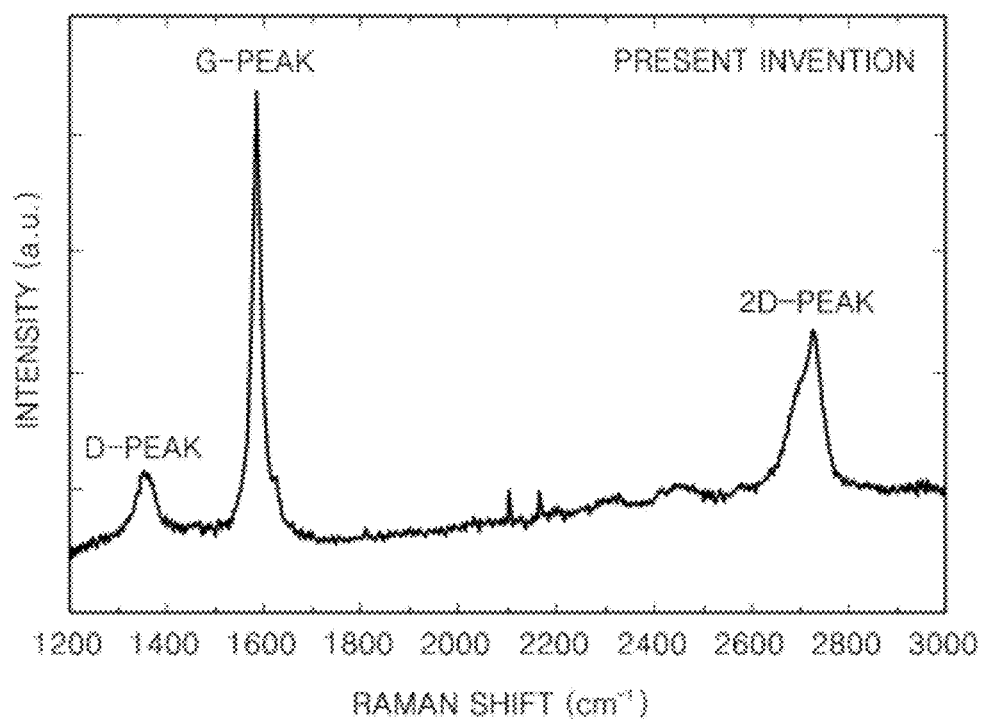
FIG. 14 is a graph showing the result of Raman spectroscopy of graphene produced according to the second experimental example of the present invention.

FIG. 14 is a graph showing the result of Raman spectroscopy of the graphene produced according to the present experimental example. Through measurement of Raman spectroscopy, a D-peak was checked at 1350 $cm^{-1}$ of the Raman shift, and a G-peak was checked in the vicinity of 1580 $cm^{-1}$, and a 2D-peak was checked in the vicinity of 2700 $cm^{-1}$.

Since the D-peak is a peak formed by a bond other than the $sp^2$ bond of carbon, the D-peak indicates that other atoms are bonded to edges of the graphene and is a criterion of defects. That is, as the D-peak is decreased and is relatively small compared to the G-peak, the quality of the graphene is improved. From the result of FIG. 14, properties of the graphene according to the present invention are excellent.

Figure 15:
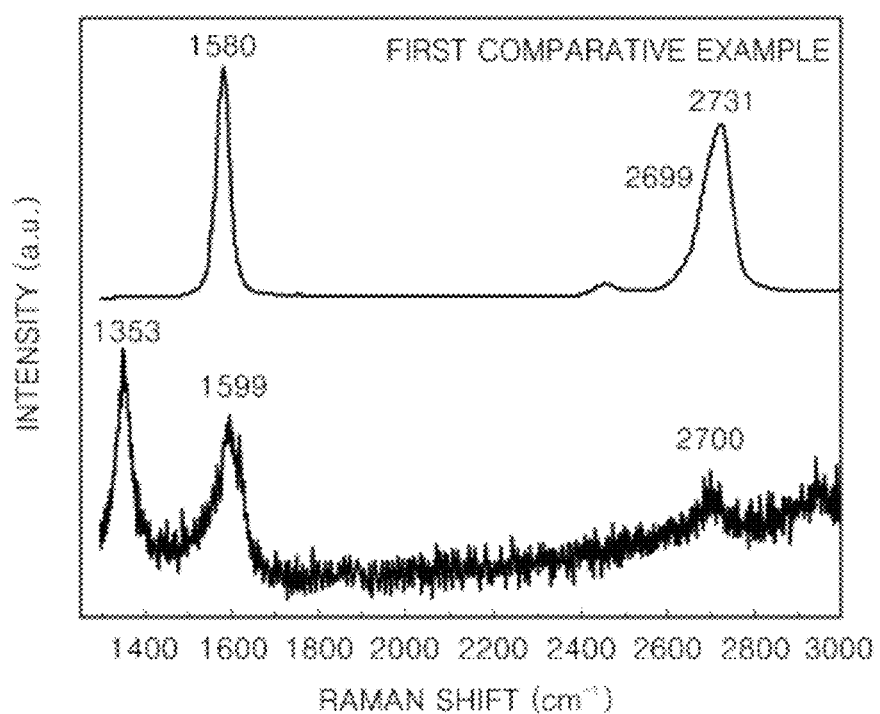
FIGS. 15 and 16 are graphs showing the result of Raman spectroscopy according to comparative examples.

FIG. 15 is a graph showing the result of Raman spectroscopy recorded in a supplementary data of the paper J. Amer. Chem. Soc. 130(47), 15802 (2008), according to a first comparative example. Referring to FIG. 15, a D-peak is very high. According to the paper, a K-GIC was produced by directly using K metals.

Figure 16:
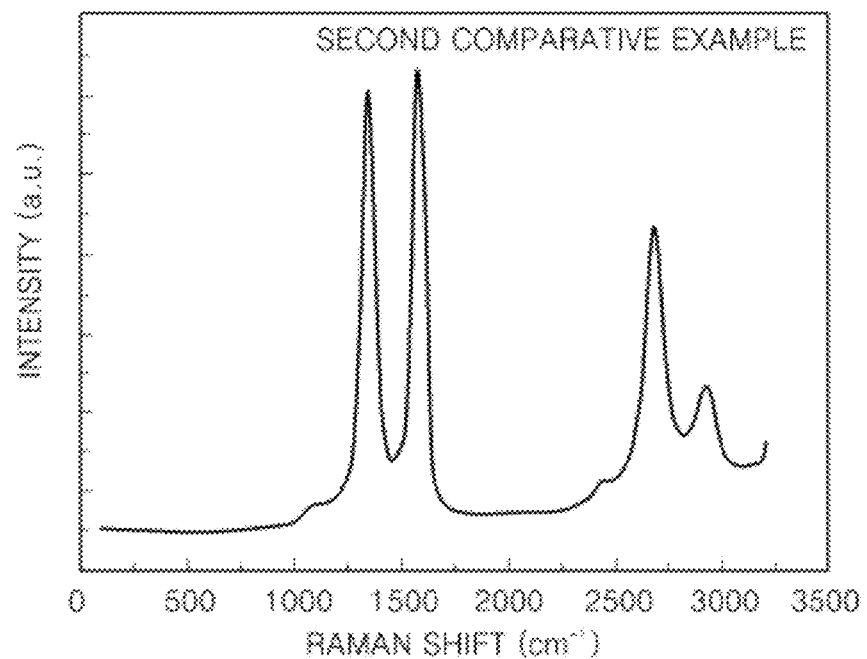

FIG. 16 is a graph showing the result of Raman spectroscopy recorded in the paper Adv. Mater. 21, 1 (2009), according to a second comparative example. In FIG. 16, the D-peak is very high. According to the paper, a GIC was not produced by inserting alkaline metals but $C_2F$. $nClF_3$ was inserted in intercalation of graphite so as to produce the graphene.

By comparing FIG. 14 as the result of the present invention with FIGS. 15 and 16 according to the first and second comparative examples, the D-peak of the present invention is relatively small compared to the G-peak and is very excellent.

Figure 17:
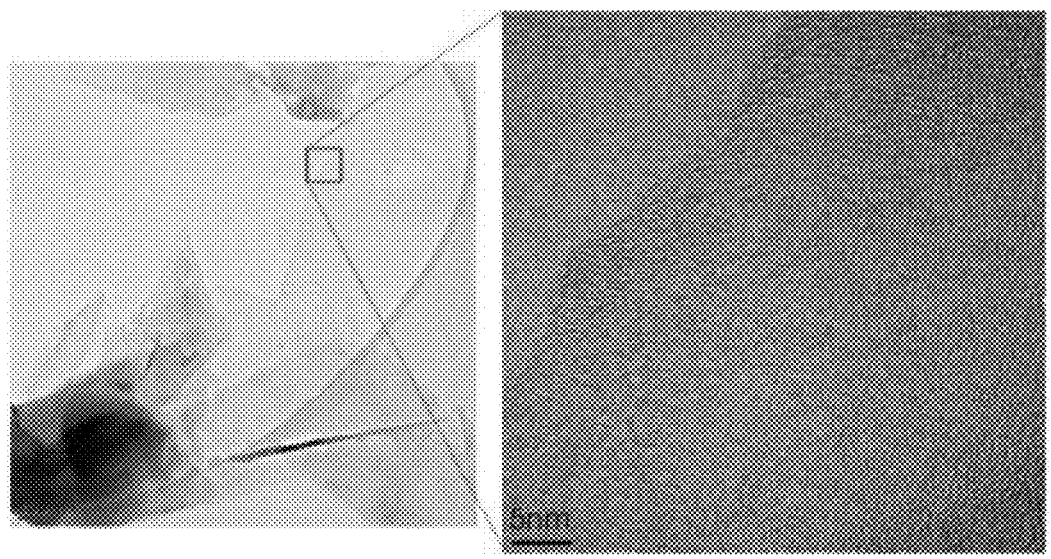
FIG. 17 is a transmission electron microscopy (TEM) photo of graphene produced according to the second experimental example of the present invention.

FIG. 17 is a transmission electron microscopy (TEM) photo of the graphene produced according to the second experimental example of the present invention. In FIG. 17, single-layer graphene was produced. The right photo of FIG. 17 is a high resolution TEM (HRTEM) photo that is taken by enlarging the left small rectangular portion. When two or more layers of the graphene are checked from the HRTEM photo, separation of layers can be checked in the vicinity of a boundary; however, in the HRTEM photo, one layer having a clear boundary surface is checked. That is, the single-layer graphene may be produced through dispersion of a GIC in which K is inserted in each of layers, by using the above process.

Figure 18:
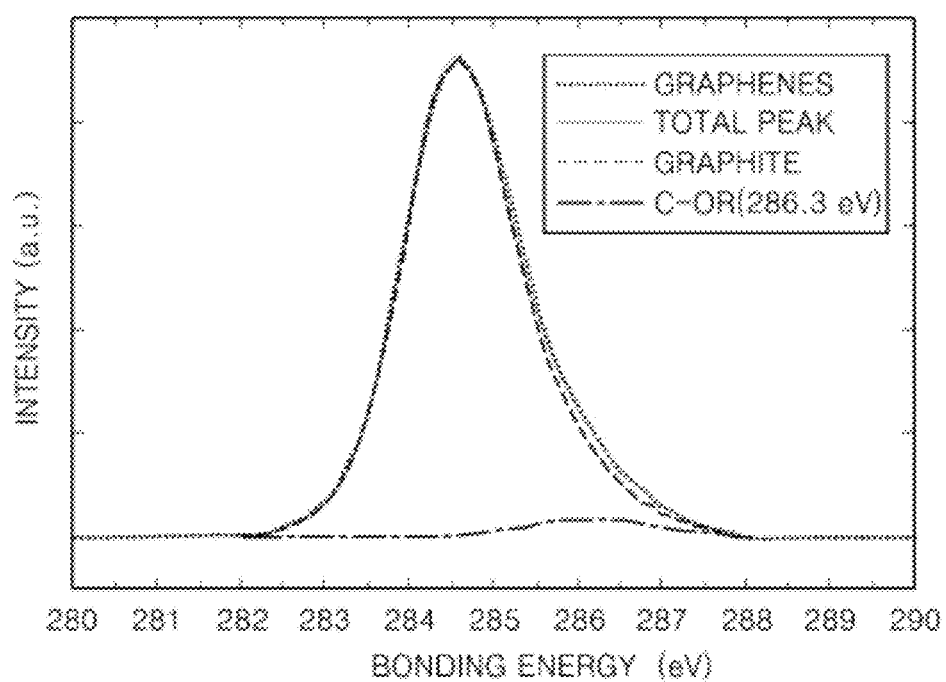
FIG. 18 is a graph showing an XPS analysis result of graphene produced according to the second experimental example of the present invention and graphite that is a raw material of this process.

FIG. 18 is a graph showing an XPS analysis result of the graphene produced according to the second experimental example of the present invention and graphite that is a raw material of this process. Referring to FIG. 18, it can be checked that a degree of oxygen atoms due to a process procedure is very low, after the process has been performed. Thus, in the above process procedure, a degree of an impure bond that occurs in the process procedure other than an impure bond formed by graphite as a raw material is very low.

Third Experimental Example

In the third experimental example, the graphene was produced by obtaining alkaline metals from alkaline metal salts. K was selected as alkaline metals to be inserted in intercalation of graphite, and a reaction between KI as alkaline metal salts and DCB as a solvent K was used in order to obtain K.

Figure 19:
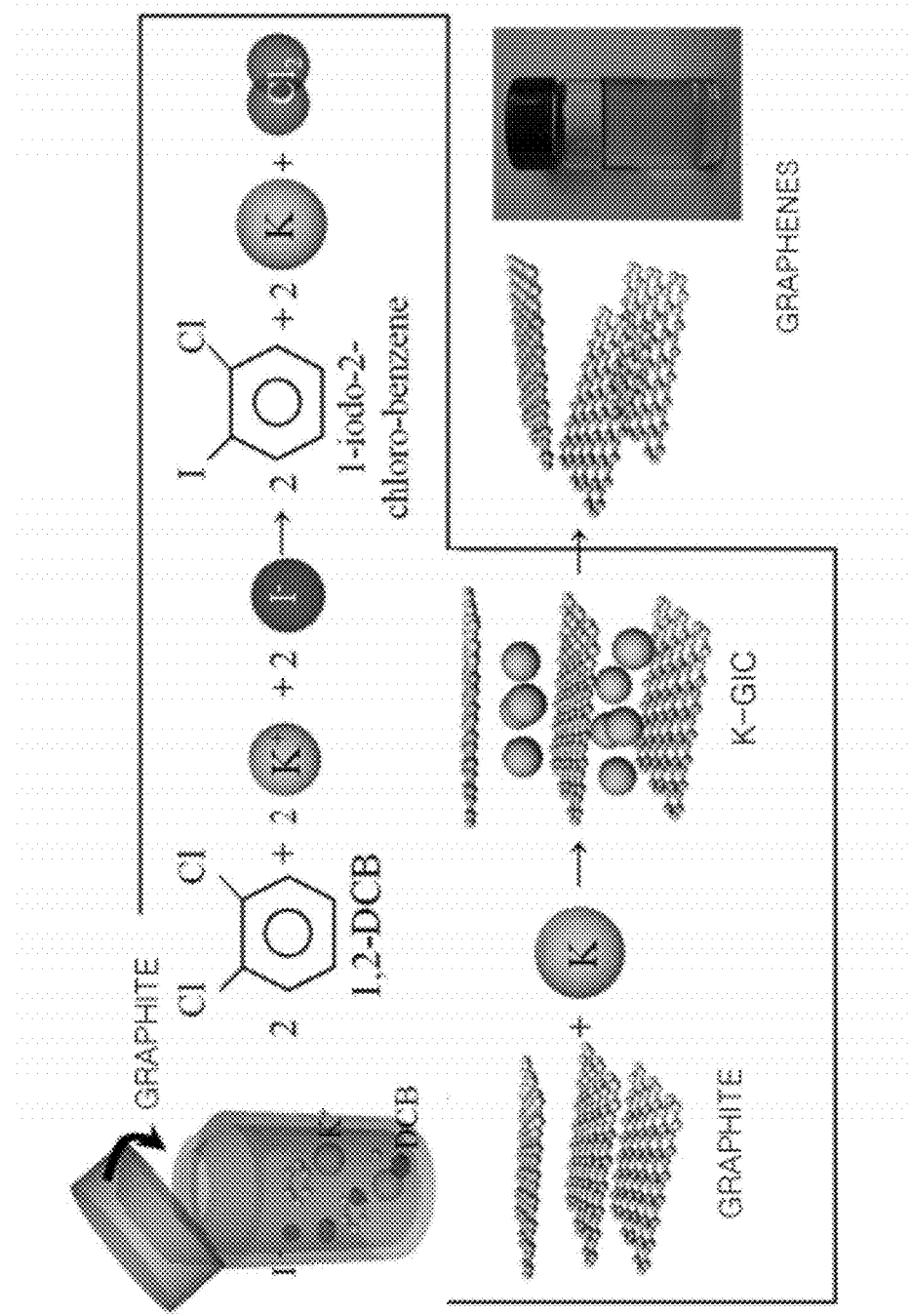
FIG. 19 is a view of a method for producing graphene according to a third experimental example of the present invention.

First, FIG. 19 is a view of a method for producing graphene according to the present experimental example.

As shown in FIG. 19, KI, DCB, and graphite were put in a container, and the container was capsulated, and the capsulated container was heated at 300° C. 1-iodo-2-chloro-benzene, and K and $Cl_2$ were obtained through a reaction between KI and DCB. K was inserted in intercalation of graphite so as to produce a K-GIC. After that, when the K-GIC is put in ethanol, inserted K was removed, and the K-GIC was dispersed, and thus the graphene was produced.

Figure 20A:
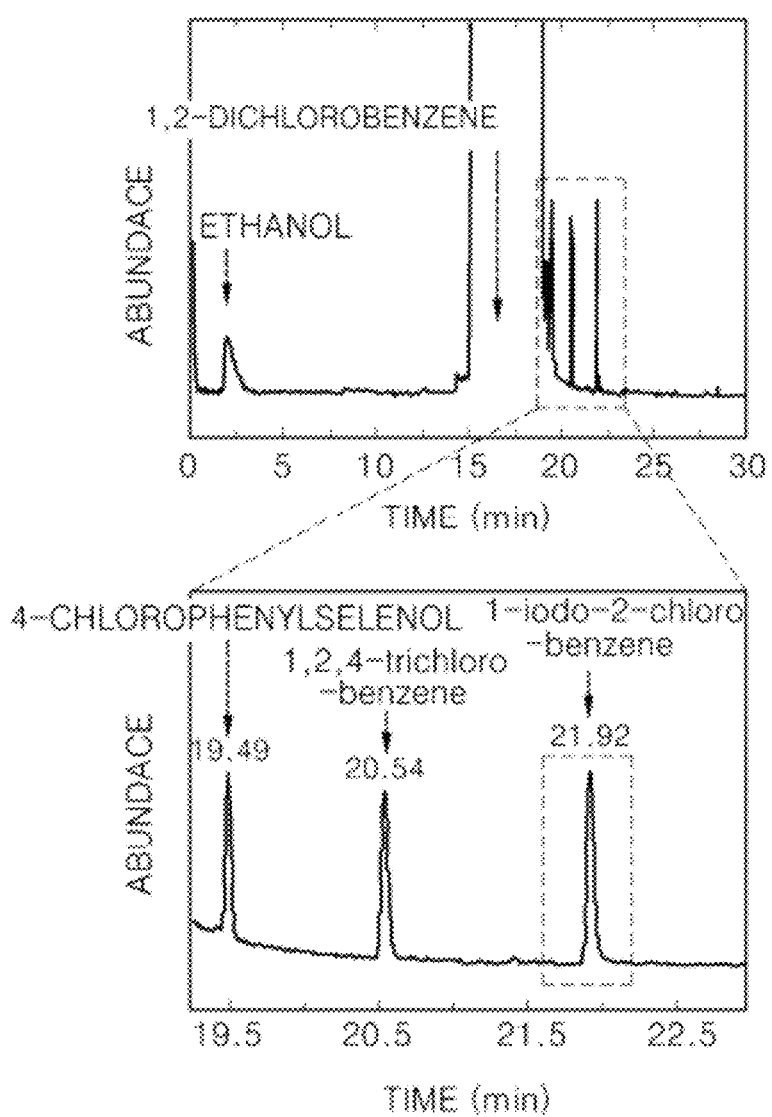
FIGS. 20A and 20B are graphs showing gas chromatography/mass spectroscopy results for checking whether 1-iodo-2-chloro-benzene is formed through a reaction between KI and DCB in the third experimental example of the present invention.
Figure 20B:
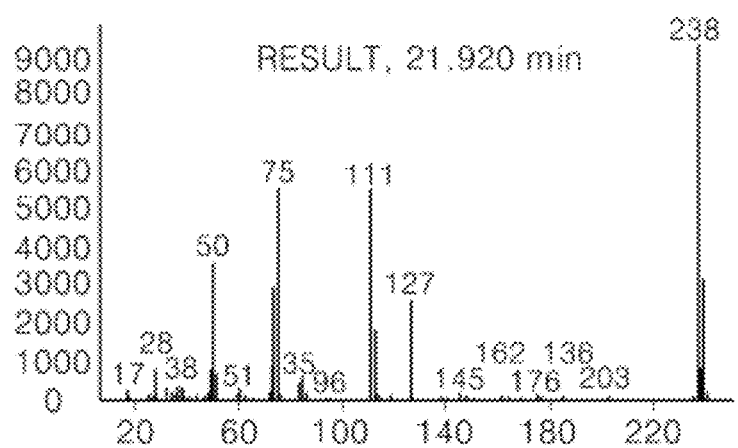
Figure 20B:
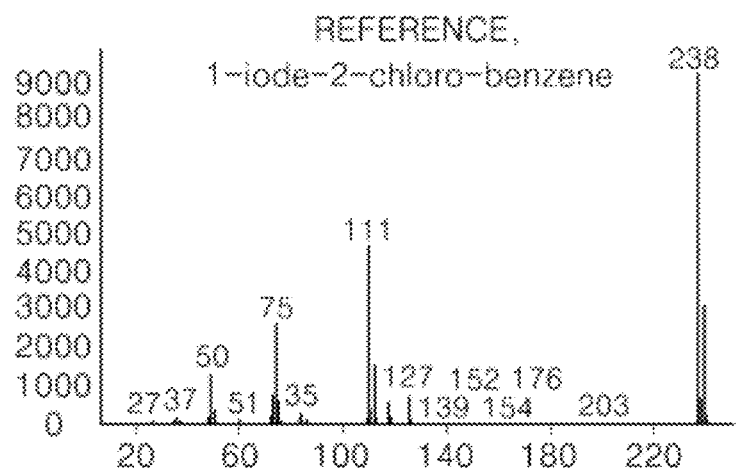

Gas chromatography/mass spectroscopy was performed in order to check whether 1-iodo-2-chloro-benzene is actually formed through the reaction between KI and DCB. FIG. 20 shows the result of gas chromatography/mass spectroscopy showing that a resultant product after the reaction coincides with 1-iodo-2-chloro-benzene by 97%.

Figures 21, 22A:
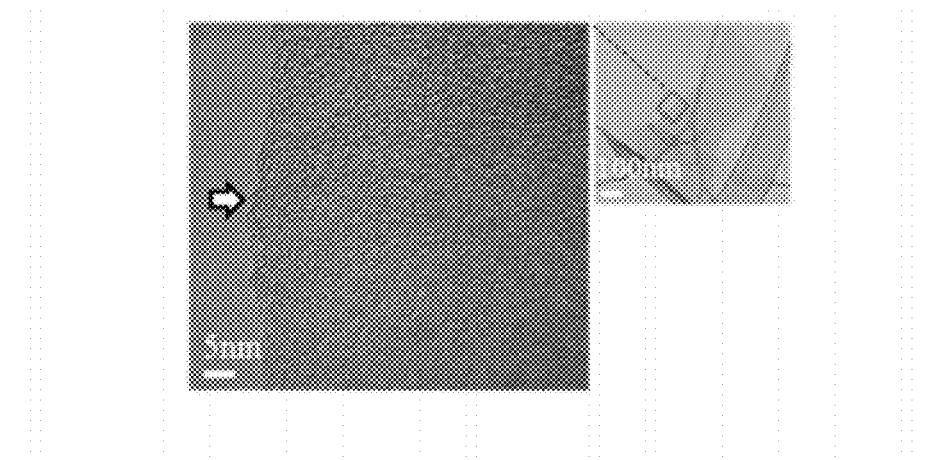
FIG. 21 shows a result of checking a variation in pH by adding distilled water in order to check whether $Cl_2$ is produced through a reaction between KI and DCB in the third experimental example of the present invention.
FIGS. 22A and 22B are high resolution TEM (HRTEM) photos showing edges of the graphene produced in the third experimental example of the present invention and edges of multiple layers of the graphene according to a comparative example, respectively.

In addition, a change of pH was checked by adding distilled water in order to check whether $Cl_2$ is generated through the reaction between KI and DCB. If chlorine gas is generated, pH decreases due to HCl through a reaction of $Cl_2 + H_2O \rightarrow HCl + HClO$. In FIG. 21, pH of B as a resultant product was 6.38 but decreased by about 3 by adding distilled water.

As described above, it can be verified from FIGS. 20 and 21 that 1-iodo-2-chloro-benzene, and K and $Cl_2$ were obtained through the reaction between KI and DCB. In this way, as suggested in the present invention, alkaline metals or alkaline earth metals are obtained through a reaction between alkaline metal salts or alkaline earth metal salts and a solvent, and a GIC is produced so that the graphene may be obtained.

Figure 22B:
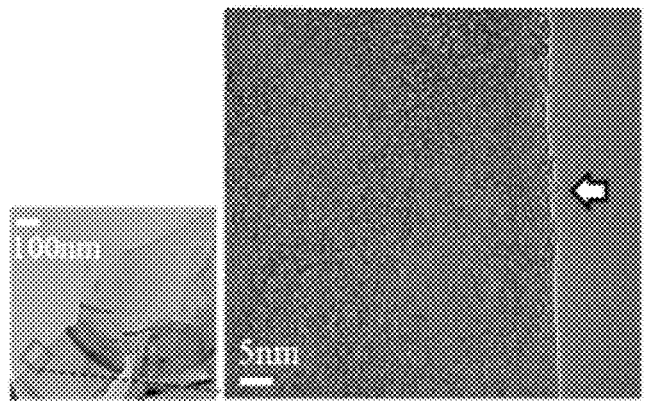

FIG. 22A is a HRTEM photo showing edges of the graphene produced in the present experimental example, and FIG. 22B is a HRTEM photo showing edges of multiple layers of the graphene according to a comparative example.

As shown in FIG. 22B, when the graphene has multiple layers, stripes corresponding to the number of layers of the graphene are formed. In FIG. 22A, there are no stripes formed in FIG. 22B. Thus, the single-layer graphene is generated through the present experimental example.

Figure 23A:
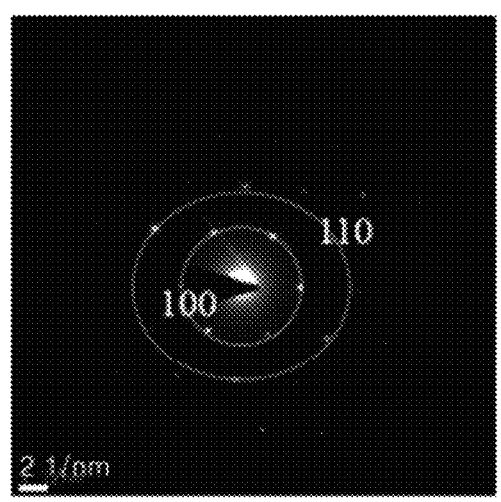
FIG. 23A is a reference view of diffraction patterns formed by a (100)-plane and diffraction patterns formed by a (110)-plane.
Figure 23B:
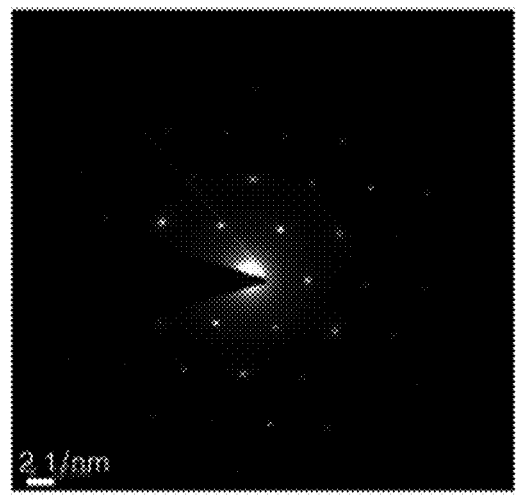
FIG. 23B shows diffraction patterns of the graphene produced in the third experimental example of the present invention.
Figure 23C:
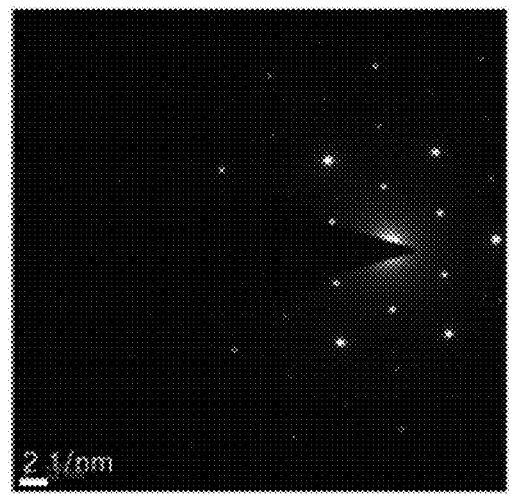
FIG. 23C shows diffraction patterns of multiple layers of the graphene according to the comparative examples.

FIG. 23A is a reference view of diffraction patterns formed by a (100)-plane and diffraction patterns formed by a (110)-plane, FIG. 23B shows diffraction patterns of the graphene produced in the present experimental example. In the case of the single-layer graphene, patterns formed by the inner (100)-plane are shown darker than patterns formed by the outer (110)-plane. FIG. 23C shows diffraction patterns of multiple layers of the graphene according to a comparative example. Patterns formed by the outer (110)-plane are shown darker than patterns formed by the inner (100)-plane. In addition, hexagonal patterns are shown only in unoxidized graphene. In FIG. 23B, hexagonal patterns are shown. Thus, the graphene produced through the present experimental example is unoxidized graphene.

Figure 24A:
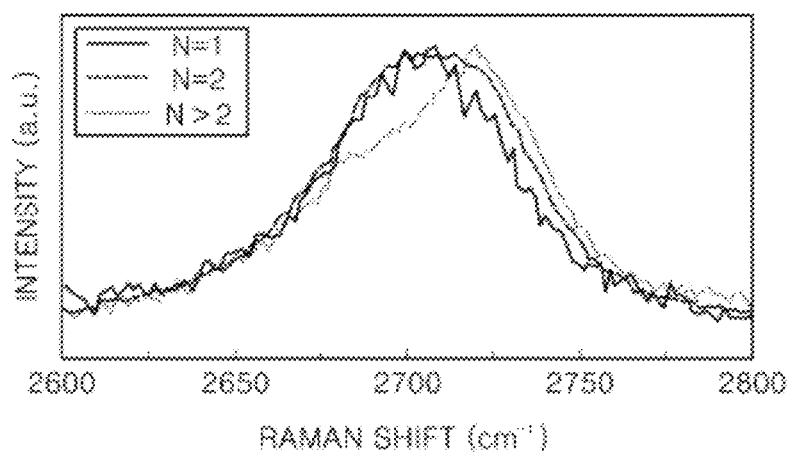
FIG. 24A is a graph showing a shape of a 2D peak of Raman spectroscopy of the graphene produced in the third experimental example of the present invention.
Figure 24B:
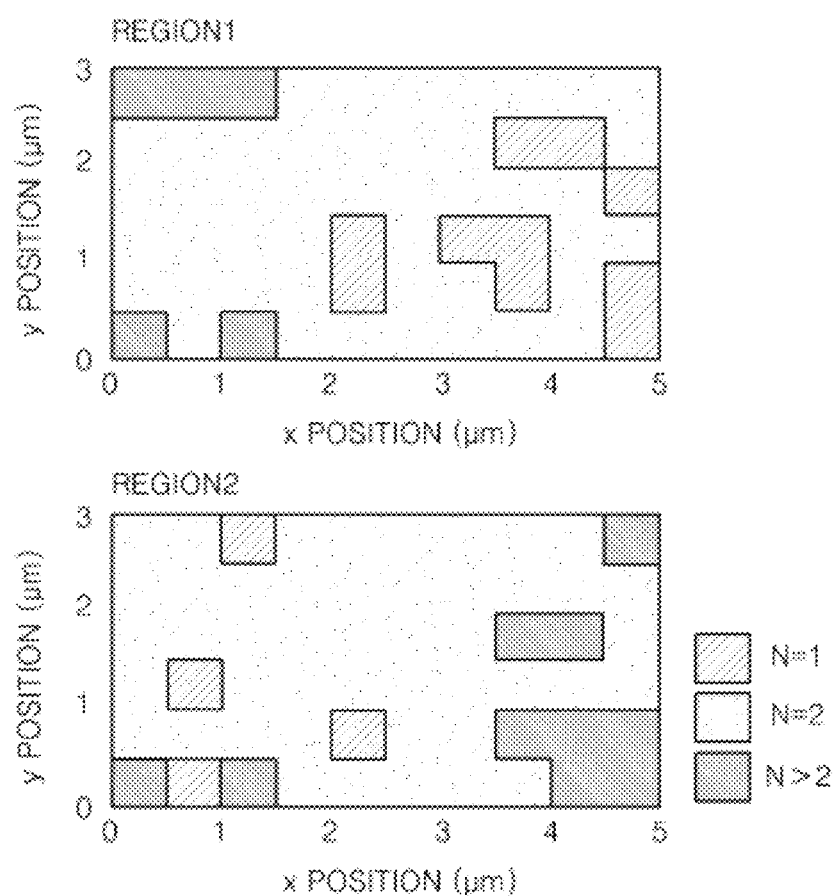
FIG. 24B is a graph showing distribution and ratio of layers based on the shape of the 2D peak by trying Raman mapping analysis of two points having a size of 5 μm×3 μm.

The number of layers of the graphene may be checked by a shape of a 2D-peak of Raman spectroscopy. FIG. 24A is a graph showing the shape of the 2D peak of Raman spectroscopy of the graphene produced in the present experimental example, and FIG. 24B is a graph showing distribution and ratio of layers based on the shape of the 2D peak by trying Raman mapping analysis of two points having a size of 5 μm×3 μm, wherein single-layer graphene of 11.67% and two-layer graphene of 75.83% exist.

Figure 25:
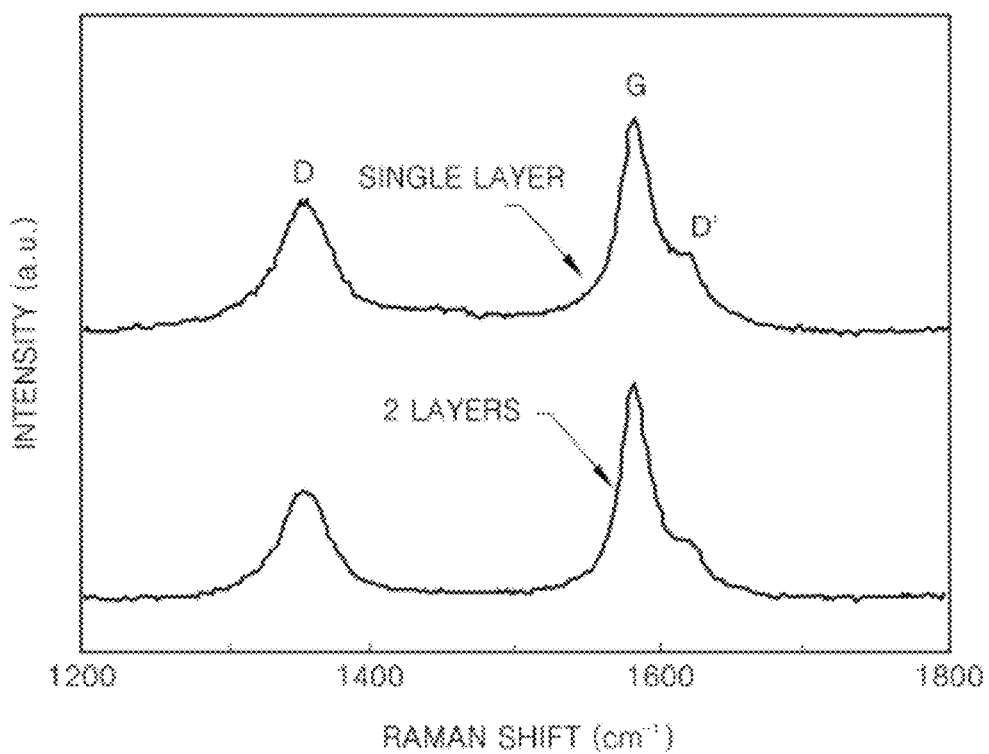
FIG. 25 is a graph showing the result of Raman spectroscopy of the graphene produced according to the third experimental example of the present invention.

FIG. 25 is a graph showing the result of Raman spectroscopy of the graphene produced according to the present experimental example. In the graphene using an existing graphite oxidation-reduction method, a D-peak intensity/G-peak intensity value is 1.2; however, according to the present experimental example, the D-peak intensity/G-peak intensity value is about 0.56. Thus, in the present invention in which the D-peak is relatively small compared to the G-peak, the high-quality graphene may be produced.

Figure 26A:
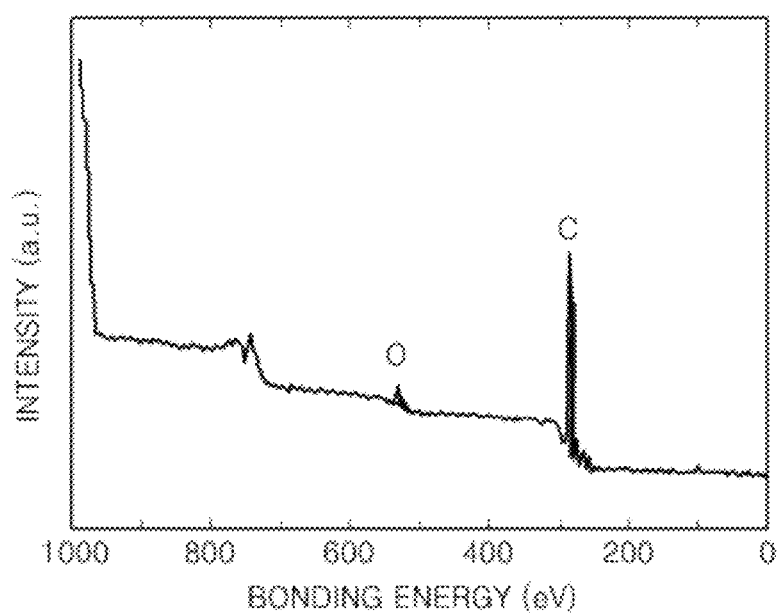
FIGS. 26A and 26B are graphs showing XPS analysis results of the graphene produced in the third experimental example of the present invention.
Figure 26B:
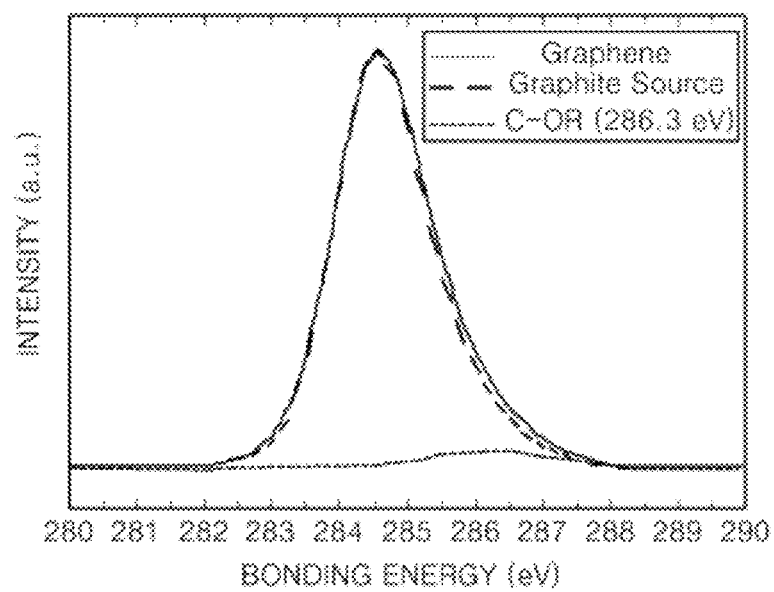

FIGS. 26A and 26B are graphs showing XPS analysis results showing that the high-quality unoxidized graphene having a very low content of oxygen is formed. FIG. 26A shows the result of wide scan, and FIG. 26B shows the result of narrow scan in the vicinity of bonding energy of carbon.

Figure 27A:
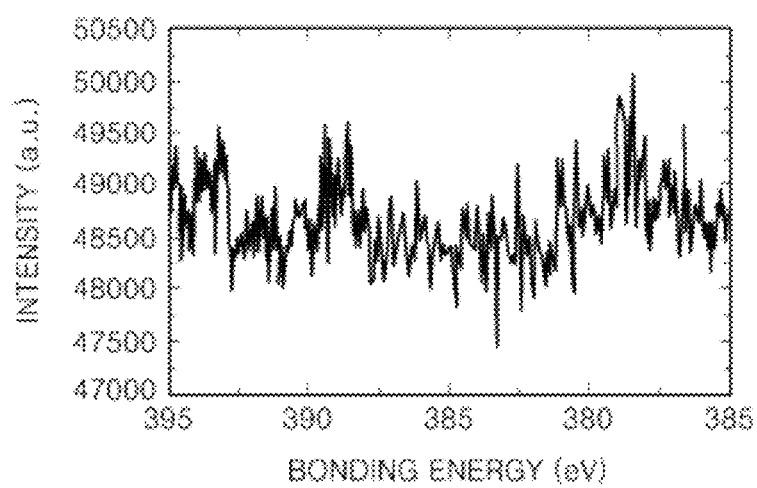
FIGS. 27A through 27C are graphs showing XPS analysis results for checking whether K, Cl, and I exist in the graphene produced in the third experimental example of the present invention.
Figure 27B:
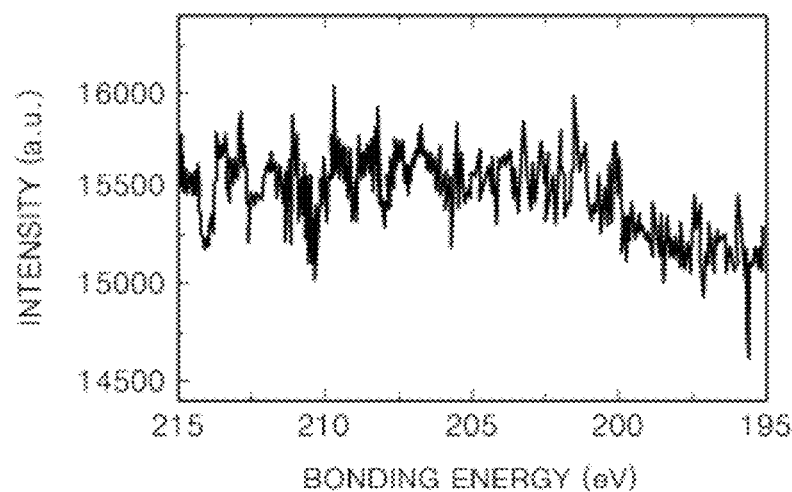
Figure 27C:
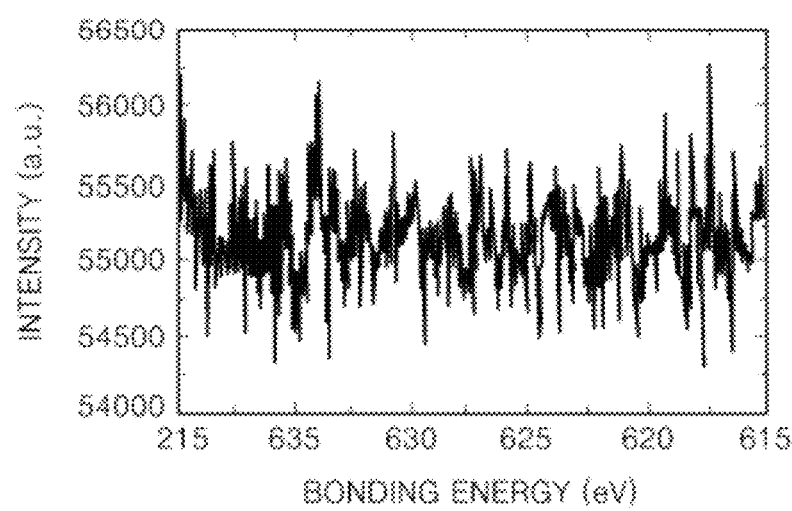

FIGS. 27A through 27C are graphs showing XPS analysis results for checking whether K, Cl, and I exist in the graphene produced in the present experimental example. FIGS. 27A, 27B, and 27C show bonding energy corresponding to K, Cl, and I, respectively. It may be checked from the analysis result that K, Cl, and I do not exist in the graphene produced according to the present experimental example.

Fourth Experimental Example

In the present experimental example, an eutectic point system of NaCl, KCl, and $ZnCl_2$ was used as a salt mixture.

Figure 28:
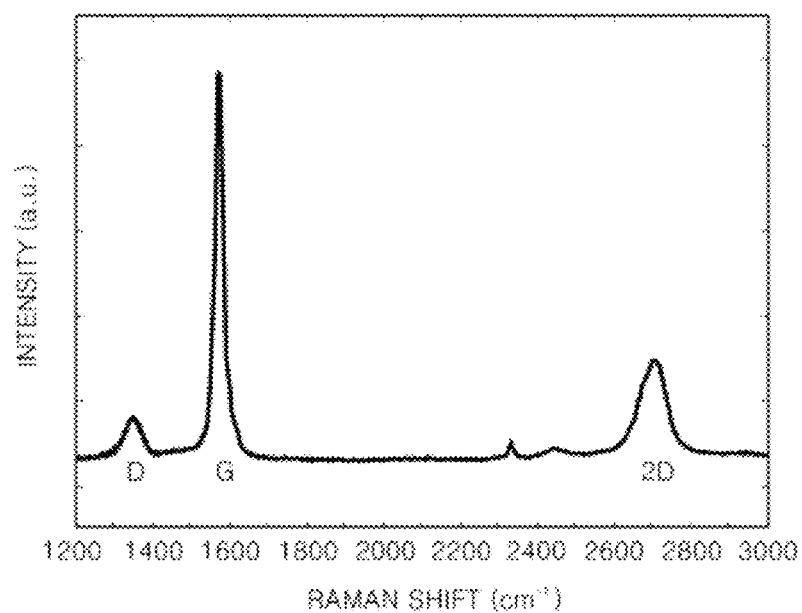
FIG. 28 is a graph showing Raman spectroscopy of the graphene produced according to a fourth experimental example of the present invention.

FIG. 28 is a graph showing Raman spectroscopy of the graphene produced according to a fourth experimental example of the present invention.

Figure 3:
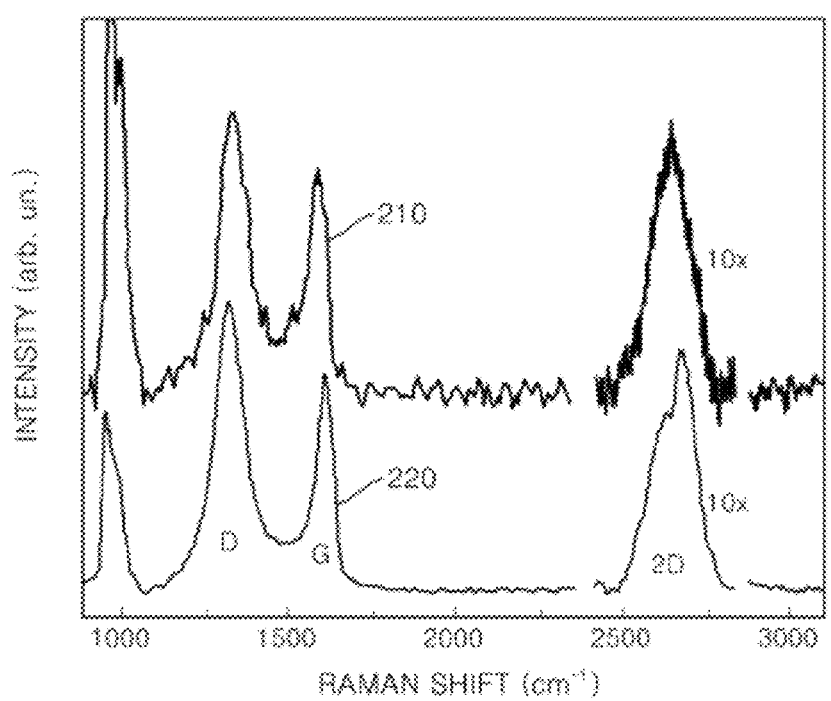
FIG. 3 is a graph showing the result of Raman spectroscopy of the graphene produced by using the conventional oxidation-reduction method.
Figure 4:
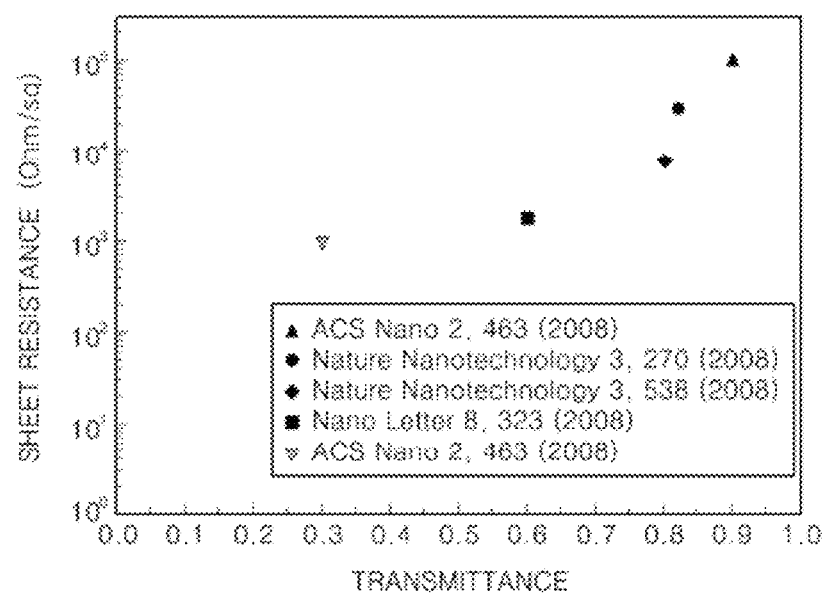
FIG. 4 is a graph showing the relationship between a sheet resistance and transmittance of the graphene produced by using the conventional oxidation-reduction method.

As shown in FIG. 28, the graphene produced according to the present invention have a very low D-peak. When FIG. 28 is compared with FIG. 3 showing the result of Raman spectroscopy of the graphene produced by a conventional oxidation-reduction method, the D-peak of the graphene produced according to the present invention is remarkably small compared to the D-peak of the graphene produced by the conventional oxidation-reduction method. Thus, the quality of the graphene produced according to the present invention is very high.

Figure 29:
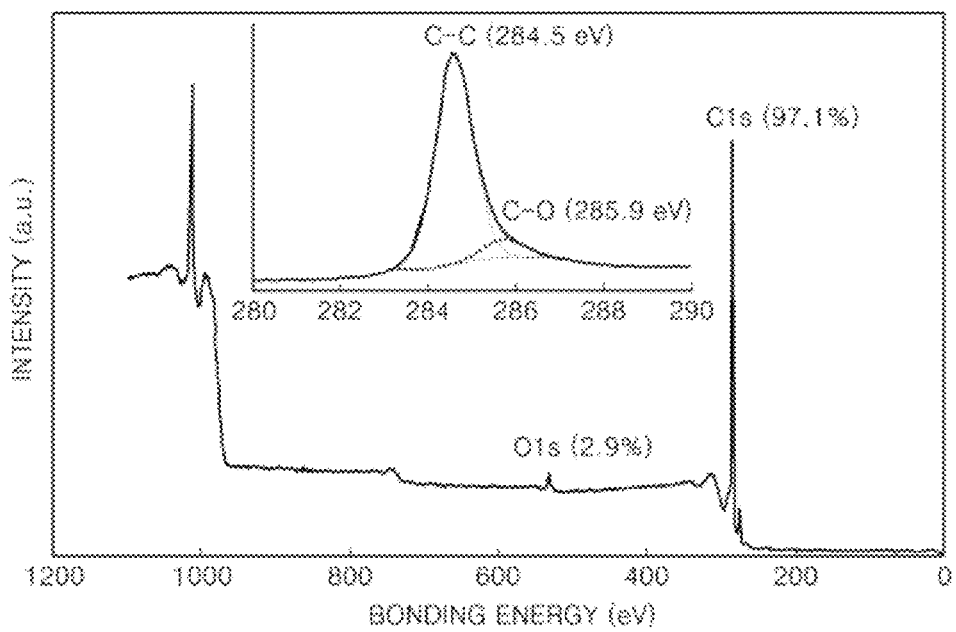
FIG. 29 is a graph showing an XPS analysis result of the graphene produced according to the fourth experimental example of the present invention.

FIG. 29 is a graph showing an XPS analysis result of the graphene produced according to the present experimental example. As shown in FIG. 29, when an eutectic point system of NaCl, KCl, and $ZnCl_2$ is used as a salt mixture according to the present invention, the high-quality graphene having a very low content of oxygen may be produced.

Figure 30:
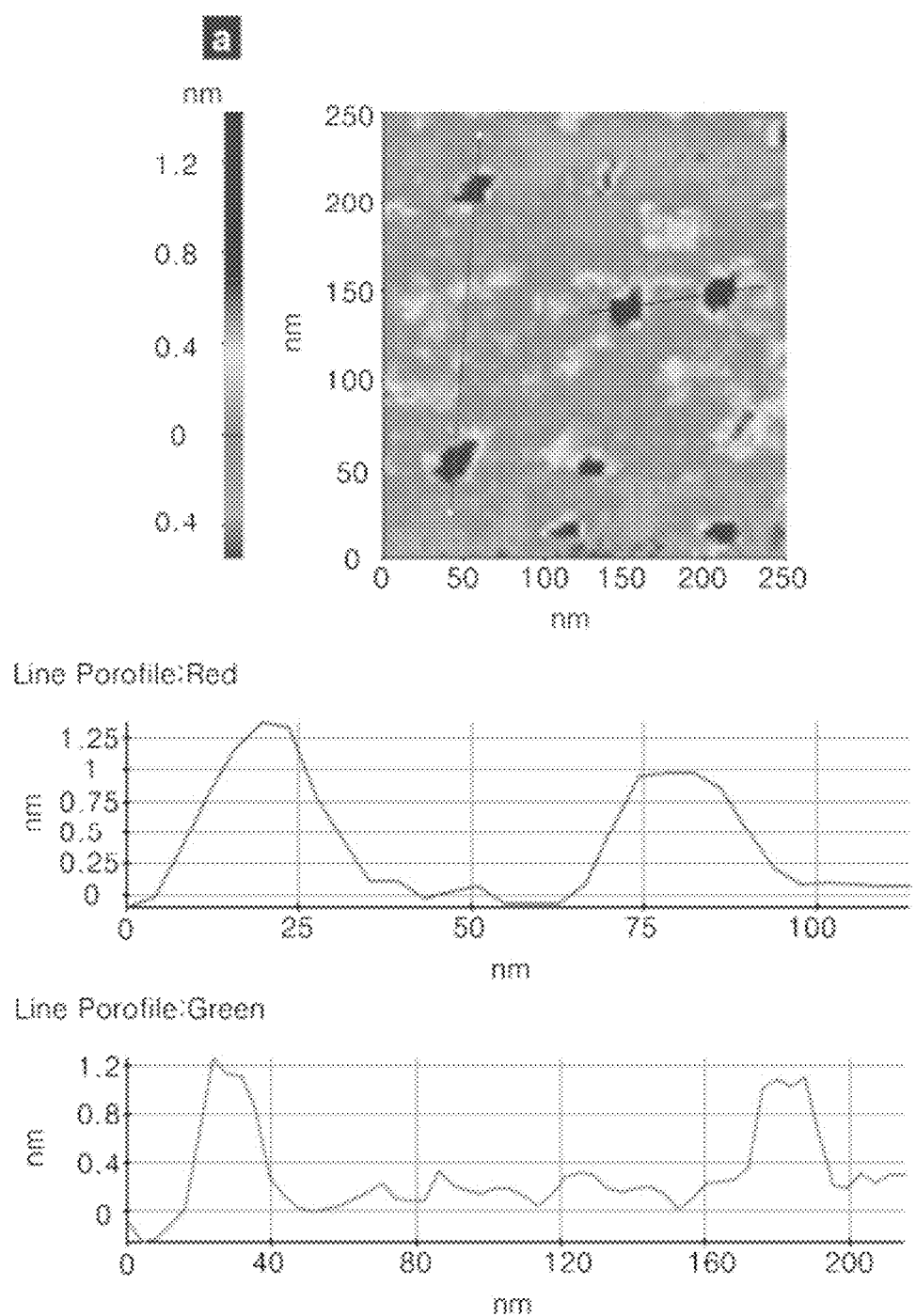
FIG. 30 shows AFM analysis result of the graphene produced according to the fourth experimental example of the present invention.

FIG. 30 shows AFM analysis result of the graphene produced according to the fourth experimental example of the present invention. In FIG. 30, graph indicated by Line Profile Red is a profile indicating a height of the graphene in a direction across two points close to a horizontal direction in the AFM drawing, and graph indicated by Line Profile: Green is a profile indicating a height of the graphene in a direction across two points close to a vertical direction in the AFM drawing. As shown in FIG. 30, when an eutectic point system of NaCl, KCl, and $ZnCl_2$ is used as a salt mixture according to the present invention, the graphene having a height of 1 nm may be obtained.

Figure 31:
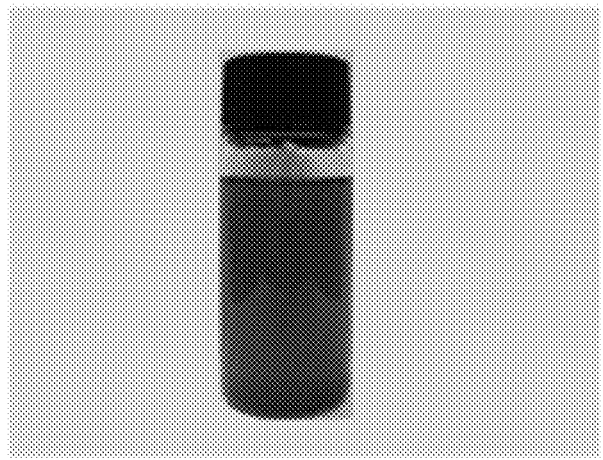
FIG. 31 is a photo showing the graphene produced according to the fourth experimental example of the present invention that is dispersed to be utilized for another purpose use.

FIG. 31 is a photo showing the graphene produced according to the present experimental example that is dispersed to be utilized for another purpose use. Propylene carbonate was used as a dispersion agent.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for producing graphenes, comprising:
   (i) mixing a salt mixture comprising two or more types of salts, wherein at least one of the two or more types of salts comprises alkaline metal salts or alkaline earth metal salts, with graphite so as to produce a mixture;
   (ii) putting the mixture in a capsulated container and heating the mixture at an eutectic point of the salt mixture or higher so as to melt the salt mixture;
   (iii) inserting alkaline metal ions or alkaline earth metal ions generated by melting the salt mixture in intercalation of the graphite so as to increase an interval between layers of the graphite and to separate the layers of the graphite from each other; and
   removing alkaline metal ions or alkaline earth metal ions from graphite intercalation compound so as to obtain graphenes by applying alcohol having a hydroxyl (—OH) group to the graphite intercalation compound,
   wherein the salt mixture is mixed at an eutectic mole ratio.

2. A method for producing graphenes, comprising:
   (i) mixing a salt mixture comprising two or more types of salts, wherein at least one of the two or more types of salts comprises alkaline metal salts or alkaline earth metal salts, with a solvent and graphite so as to produce a mixture;
   (ii) putting the mixture in a capsulated container and dissolving the salt mixture in the solvent;
   (iii) inserting alkaline metal ions or alkaline earth metal ions generated by dissolving the salt mixture in intercalation of the graphite so as to increase an interval between layers of the graphite and to separate the layers of the graphite from each other; and
   removing alkaline metal ions or alkaline earth metal ions from graphite intercalation compound so as to obtain graphenes by applying alcohol having a hydroxyl (—OH) group to the graphite intercalation compound.

3. A method for producing graphenes, comprising:
   (i) mixing alkaline metal salts or alkaline earth metal salts with a solvent and graphite so as to produce a mixture;
   (ii) putting the mixture in a capsulated container and obtaining alkaline metals or alkaline earth metals through a reaction between the solvent and the alkaline metal salts or alkaline earth metal salts;
   (iii) inserting the alkaline metals or alkaline earth metals in intercalation of the graphite so as to increase an interval between layers of the graphite and to separate the layers of the graphite from each other; and
   removing alkaline metal ions or alkaline earth metal ions from graphite intercalation compound so as to obtain graphenes by applying alcohol having a hydroxyl (—OH) group to the graphite intercalation compound.

4. The method of claim 1, further comprising removing a by-product formed in the forming of the graphite intercalation compound.

5. The method of claim 3, which adding at least one selected from the group consisting of tetrahydrofuran (THF), ammonia, toluene, benzene, dimethyl sulfoxide (DMSO), and dimethylformamide (DMF) to the mixture.

6. The method of claim 1, wherein the salt mixture comprises salts that do not contain oxygen.

7. The method of claim 1, wherein the alkaline metal salts or alkaline earth metal salts comprise metal halide.

8. The method of claim 1, wherein the salt mixture is produced to have an eutectic point of 500° C. or less.

9. A method for producing graphenes, comprising:
mixing a salt mixture comprising two or more types of salts, wherein at least one of the two or more types of salts comprises alkaline metal salts or alkaline earth metal salts, with graphite so as to produce a mixture;
putting the mixture in a capsulated container and heating the mixture so as to dissociate the salt mixture to positive ions and negative ions, reacting mutual negative ions so as to form a by-product and inserting the positive ions in intercalation of the graphite so as to produce a graphite intercalation compound; and
removing the by-product and the positive ions from the graphite intercalation compound so as to obtain graphenes by applying alcohol having a hydroxyl (—OH) group to the graphite intercalation compound, wherein the salt mixture is mixed at an eutectic mole ratio.

10. The method of claim 9, wherein the alkaline metal salts or alkaline earth metal salts comprise metal halide.

11. A method for producing graphenes, comprising:
mixing alkaline metal salts or alkaline earth metal salts with a solvent and graphite so as to produce a mixture;
putting the mixture in a capsulated container and heating the mixture, reacting the alkaline metal salts or alkaline earth metal salts with the solvent so as to obtain alkaline metals or alkaline earth metals and inserting the alkaline metals or alkaline earth metals in intercalation of the graphite so as to produce a graphite intercalation compound; and
removing the alkaline metals or alkaline earth metals from the graphite intercalation compound so as to obtain graphenes by applying alcohol having a hydroxyl (—OH) group to the graphite intercalation compound.

* * * * *